United States Patent
Shinoda

(10) Patent No.: US 9,602,192 B2
(45) Date of Patent: Mar. 21, 2017

(54) COMMUNICATION APPARATUS USING RADIO WAVES BETWEEN ROTATOR AND STATOR

(71) Applicant: HITACHI, LTD., Chiyoda-ku, Tokyo (JP)

(72) Inventor: Hiroshi Shinoda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/763,014

(22) PCT Filed: Jan. 30, 2013

(86) PCT No.: PCT/JP2013/051946
§ 371 (c)(1),
(2) Date: Jul. 23, 2015

(87) PCT Pub. No.: WO2014/118901
PCT Pub. Date: Aug. 7, 2014

(65) Prior Publication Data
US 2015/0372751 A1     Dec. 24, 2015

(51) Int. Cl.
*H04B 7/24*     (2006.01)
*H01Q 7/00*     (2006.01)
(Continued)

(52) U.S. Cl.
CPC ............ *H04B 7/24* (2013.01); *H01P 1/062* (2013.01); *H01Q 1/22* (2013.01); *H01Q 7/00* (2013.01);
(Continued)

(58) Field of Classification Search
CPC ........................................................ H04B 7/24
See application file for complete search history.

(56) References Cited

U.S. PATENT DOCUMENTS

| | | | | |
|---|---|---|---|---|
| 3,936,954 A * | 2/1976 | Anderson | ................ | G09B 9/56 434/6 |
| 5,133,047 A * | 7/1992 | Hariki | ................ | G05B 19/4182 700/262 |
| 2009/0280743 A1* | 11/2009 | Gast | ..................... | B23Q 1/0027 455/41.2 |

FOREIGN PATENT DOCUMENTS

| | | |
|---|---|---|
| JP | 2002-136191 A | 5/2002 |
| JP | 2009-273129 A | 11/2009 |

OTHER PUBLICATIONS

International Search Report from International Patent Application No. PCT/JP2014/051946, Apr. 23, 2013.

* cited by examiner

*Primary Examiner* — Tuan H Nguyen
(74) *Attorney, Agent, or Firm* — Miles & Stockbridge P.C.

(57) ABSTRACT

An insulating transmission medium with high insulation reliability which transmits electromagnetic energy between circuits having different reference voltages, with low loss, in small size, and at low cost, and a communication apparatus which uses radio waves between a rotator and a stator to perform two-way communication between at least one rotator-specific communication device placed on a rotator. One stator-specific communication device is placed on a stator and is connected to multiple stator-specific antennas. The rotator-specific communication device is connected to at least one rotator-specific antenna, and includes a signal strength indicator. The stator-specific communication device includes a phase shifter which increases or decreases the phase angle of the signal by a phase shift amount in such a manner as that the signal strength is equal to or more than a predetermined value.

18 Claims, 22 Drawing Sheets

(51) Int. Cl.
  *H01Q 21/24* (2006.01)
  *H01P 1/06* (2006.01)
  *H01Q 1/22* (2006.01)
  *H02P 9/00* (2006.01)
  *H02P 9/30* (2006.01)
(52) U.S. Cl.
  CPC ............. *H01Q 21/24* (2013.01); *H02P 9/007* (2013.01); *H02P 9/30* (2013.01)

FIG. 5

| k | $\psi_{ak}$ [deg] | $\psi_{bk}$ [deg] | $\psi_{ck}$ [deg] | $\psi_{dk}$ [deg] |
|---|---|---|---|---|
| 1 | 0 | 0 | 0 | 0 |
| 2 | 0 | 90 | 0 | 0 |
| 3 | 0 | 90 | 0 | 90 |
| 4 | 0 | 90 | 0 | 180 |
| 5 | 0 | 90 | 90 | 0 |
| 6 | 0 | 90 | 90 | 90 |
| 7 | 0 | 90 | 90 | 180 |
| 8 | 0 | 90 | 180 | 0 |
| 9 | 0 | 90 | 180 | 90 |
| 10 | 0 | 90 | 180 | 180 |
| 11 | 0 | 180 | 0 | 0 |
| 12 | 0 | 180 | 0 | 90 |
| 13 | 0 | 180 | 0 | 180 |
| 14 | 0 | 180 | 90 | 0 |
| 15 | 0 | 180 | 90 | 90 |
| 16 | 0 | 180 | 90 | 180 |
| 17 | 0 | 180 | 180 | 0 |
| 18 | 0 | 180 | 180 | 90 |
| 19 | 0 | 180 | 180 | 180 |

FIG. 16

| k | $e_{ak}$ | $e_{bk}$ | $e_{ck}$ | $e_{dk}$ |
|---|---|---|---|---|
| 1 | 1 | 1 | 1 | 1 |
| 2 | 1 | 1 | 1 | 0 |
| 3 | 1 | 1 | 0 | 1 |
| 4 | 1 | 1 | 0 | 0 |
| 5 | 1 | 0 | 1 | 1 |
| 6 | 1 | 0 | 1 | 0 |
| 7 | 1 | 0 | 0 | 1 |
| 8 | 1 | 0 | 0 | 0 |
| 9 | 0 | 1 | 1 | 1 |
| 10 | 0 | 1 | 1 | 0 |
| 11 | 0 | 1 | 0 | 1 |
| 12 | 0 | 1 | 0 | 0 |
| 13 | 0 | 0 | 1 | 1 |
| 14 | 0 | 0 | 1 | 0 |
| 15 | 0 | 0 | 0 | 1 |

# COMMUNICATION APPARATUS USING RADIO WAVES BETWEEN ROTATOR AND STATOR

TECHNICAL FIELD

The present invention relates to a communication device that transmits and receives signals between a rotator and a stator, and especially relates to a communication device used for a rotating electrical machine of a wind power generation system.

BACKGROUND ART

Efforts to use renewable energy are gaining momentum, year by year, toward reducing emissions of $CO_2$ being one of main substances for global warming, and supplying energy stably. Especially, wind power generation is focused on from the viewpoints of stability and profitability, and most of all, the amount of introduction of offshore wind turbines is expected to increase in the future for an increase in scale and the stabilization of the volume of air.

However, the offshore wind turbines have an issue that the maintenance cost increases compared to land wind turbines. Especially, in an AC excited generator used in many cases as a generator for wind power, electric power is supplied to a rotor through a brush. Accordingly, the wear of the brush and electrolytic corrosion occur, and the frequency of maintenance increases, which spurs the increase of costs.

For example, in PTL 1, a brushless AC excited generator is described with the object of providing a rotating electrical machine and the like that can improve power generation efficiency while facilitating maintenance.

The publication discloses a configuration in which a rotating exciter and an electric power converter are provided coaxially with the AC excited generator, the power of an electric power system is rectified to direct current, a stator of the rotating exciter is brought into conduction, the power is supplied to a rotor by the principle of the synchronous generator, and then the electric power converter supplies the power the power whose voltage and frequency have been converted to a rotor of the doubly fed synchronous generator to perform a power generation operation. According to the configuration, the electric power converter is attached to the rotor. Accordingly, the electric power converter rotates with the rotation of the rotor. It is described that the electric power converter requires control in accordance with the rotation of the wind turbine, and control signal transmission by optical communication is used to receive a control signal brushlessly.

Moreover, PTL 2 discloses a wireless communication technology of a rotator. A plurality of antennas is arranged at at least one of a rotator and a stator in at least a substantially regular distribution in a direction along the periphery of rotation. The plurality of antennas is connected in parallel to a transmission apparatus or receiving apparatus.

The lengths of the antennas overlap in the direction along the periphery of rotation. These antennas are offset at least partially in the direction of the radius or length of a rotation shaft, and arranged. The transmission apparatus supplies a signal phase-shifted by a delay element to each antenna. The receiving apparatus causes a delay element to phase shift and superimpose the signals received at the antennas. In other words, it is described that even if there is a null point in the directivity of one antenna on the rotator side or stator side, the signal strength can be increased by combining the received signals of the plurality of antennas arranged regularly on the other side.

CITATION LIST

Patent Literature

PTL 1: JP 2002-136191 A
PTL 2: JP 2009-273129 A

SUMMARY OF INVENTION

Technical Problem

In the AC excited generator described in PTL 1, optical communication used as means for contactless communication with the electric power converter has a narrow communication range since the signal has strong straightness. Therefore, performing stable and continuous communication also during rotation requires the extension of the communication range with multiple optical elements. The larger the generator, the more outstanding the tendency. Therefore, more optical elements are required. Moreover, the inside of the generator is assumed to become higher in temperature. However, generally, the optical element significantly reduces its life under high temperature operation. As a result, it may become a factor in increasing the frequency of maintenance.

The rotator wireless communication technology described in PTL 2 improves the above-mentioned issues of the narrowness of the communication range and the short life with the use of radio waves. Furthermore, the null point of an antenna can be recovered by combining signals with the delay element.

However, the present technology does not have means for controlling the amount of phase shift by the delay element. Accordingly, it is difficult to react under a complicated multipath environment due to multiple reflections in a housing made of a conductor.

Especially, if the conductive housing is large with respect to the wavelength of a radio wave to be used, it results in a more complicated multipath environment. Accordingly, the signal strength changes also during rotation. Moreover, the present technology describes one-to-one communication. However, the above-mentioned electric power converter needs one-to-N communication.

The above-mentioned electric power converter is configured of N high voltage power devices. These power devices are turned on/off at their respective timings. Therefore, insulation is essential between power devices. Therefore, one-to-N communication is required. Furthermore, in a brushless AC excited generator, a control signal is generated from various pieces of sensing information on the rotor side. Accordingly, it is required to exchange the control signal and the sensing information in two-way communication in addition to the above point.

The present invention has been made to solve the above issues. An object thereof is to provide a rotator communication apparatus that, even under a complicated multipath environment due to multiple reflections in a conductive housing, can communicate stably and continuously also during rotation and is capable of one-to-N communication and two-way communication.

Solution to Problem

A representative example of the present invention is illustrated as follows:

A rotator communication apparatus, including:
a stator; and
a substantially cylindrical rotator which rotates around a rotation shaft attached to the stator,
the rotator communication apparatus performing two-way communication between at least one rotator-specific communication device placed on the rotator and one stator-specific communication device placed on the stator by using radio waves to transmit a downstream signal from the stator-specific communication device to the rotator-specific communication device, and transmit an upstream signal from the rotator-specific communication device to the stator-specific communication device, wherein
the stator-specific communication device is connected to a plurality of stator-specific antennas,
the rotator-specific communication device is connected to at least one rotator-specific antenna,
the stator-specific antennas and the rotator-specific antenna are respectively arranged on the stator and the rotator in such a manner as that their respective radiation surfaces face each other,
the rotator-specific communication device includes a signal strength indicator which detects the signal strength of the downstream signal, and
the stator-specific communication device includes
a phase shifter which increases or decreases the phase angles of the downstream and upstream signals by a phase shift amount in such a manner as that the signal strength is equal to or more than a predetermined value,
a phase shift controller which controls the phase shifter to make an increase or decrease by the phase shift amount, and
a combiner/splitter which distributes the downstream signal to the phase shifter, and combines the upstream signals to output to the stator-specific communication device.

Advantageous Effects of Invention

The present invention can provide a rotator communication apparatus that, even under a complicated multipath environment due to multiple reflections in a conductive housing, can communicate stably and continuously also during rotation and is capable of one-to-N communication and two-way communication.

Issues, configurations, and effects other than those described above will become evident from the descriptions of the following embodiments.

BRIEF DESCRIPTION OF DRAWINGS

FIG. 5 is a diagram illustrating an example of combinations of phase shift amounts according to the first embodiment.

FIG. 16 is a diagram illustrating an example of phase shift amounts according to the fourth embodiment.

DESCRIPTION OF EMBODIMENTS

Figure 1:
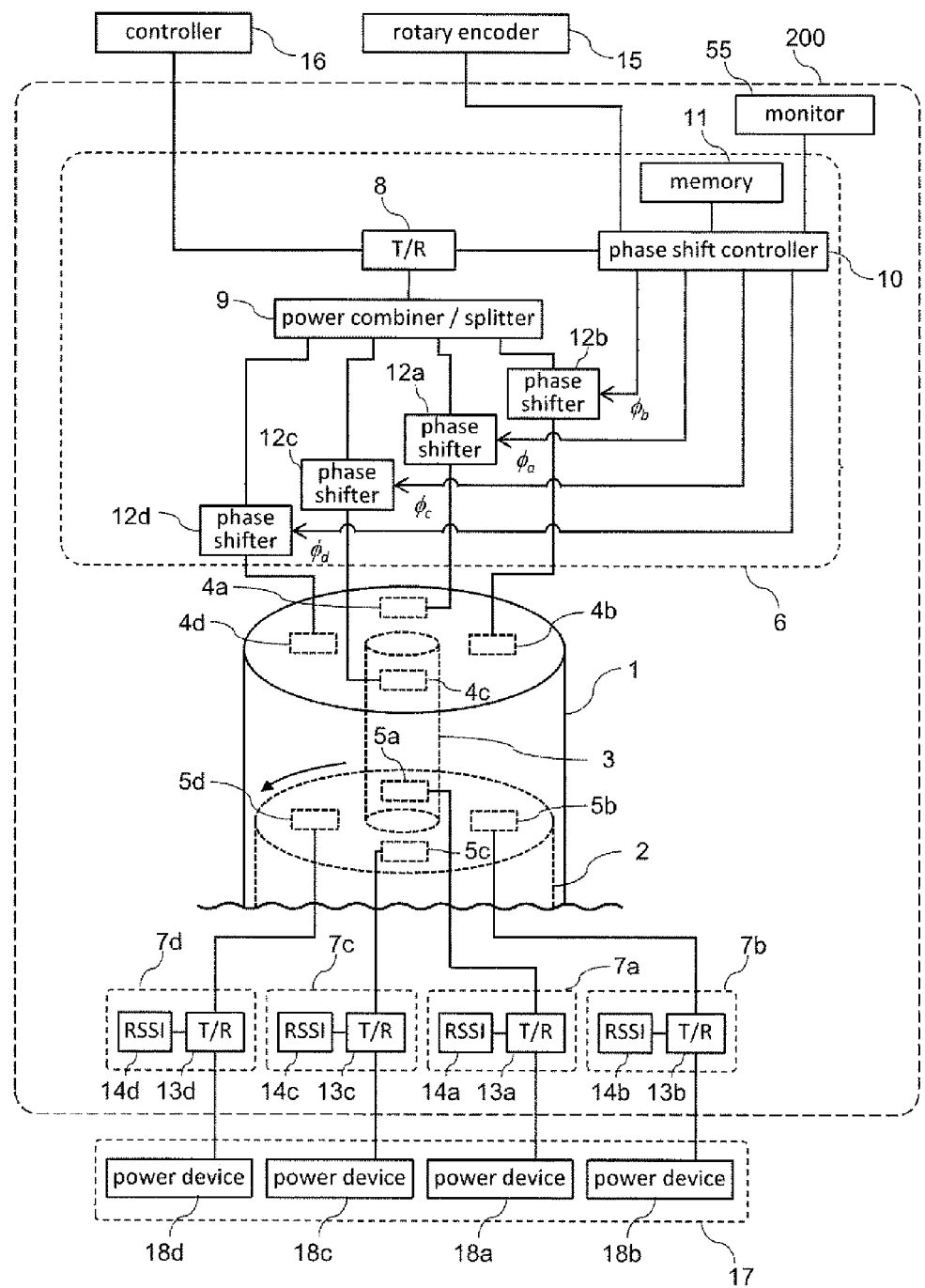
FIG. 1 is a block diagram illustrating the configuration of a rotator communication apparatus 200 according to a first embodiment.

In the following embodiments, a description is given dividing the following part into a plurality of sections or embodiments if necessary for convenience. However, unless otherwise specified explicitly, they are not irrelevant to each other and there is a relationship where one is a modification, details, a supplementary explanation, and the like of part or all of the other.

Moreover, in the following embodiments, if the number of elements, and the like (including the quantity, numerical value, amount, and range) are referred to, unless otherwise specified explicitly and limited to a particular number clearly in theory, there is no limitation to its particular number and the number may be the particular number or greater/less. Furthermore, in the following embodiments, it goes without saying that the components (also including elemental steps) are not necessarily essential unless otherwise specified explicitly and is clearly considered to be essential in theory. Similarly, in the following embodiments, if the shapes, positional relationships, and the like of the components and the like are referred to, it is assumed to include those substantially approximate or similar to the shapes and the like unless otherwise specified explicitly and is clearly considered not to be the case in theory. The same shall apply to the numerical value and range.

Moreover, in the following embodiments, when mention is made of "conductor", it indicates a conductive material in an electromagnetic waveband used to propagate electromagnetic waves and, when mention is made of "dielectric", it indicates a dielectric material in an electromagnetic waveband used to propagate electromagnetic waves.

Therefore, no direct limitation is placed by whether to be a conductor, semiconductor, dielectric, or the like in relation to, for example, direct current. Moreover, a conductor and a dielectric are defined by their characteristics in the relationship with the electromagnetic wave, and do not limit a form, such as whether to be a solid, liquid, gas, or the like, or constituent materials.

Moreover, in all the drawings for describing the following embodiments, the same reference numerals are assigned in principle to those having the same functions, and their descriptions are omitted to avoid repetition. Hereinafter, embodiments of the present invention are described in detail based on the drawings.

First Embodiment

Hereinafter, a rotator communication apparatus according to a first embodiment of the present invention is described with reference to FIGS. 1 to 7.

FIG. 1 is a block diagram illustrating the configuration of a rotator communication apparatus 200.

A portion where antennas are mounted is illustrated by a perspective view to facilitate the understanding of the arrangement of the antennas. The rotator communication apparatus 200 is used for two-way wireless communication between an electric power converter 17 attached to a rotator 2, and a controller 16 attached to a stator 1. The controller 16 controls power devices 18a to 18d configuring the electric power converter 17.

Although not illustrated, the power devices 18a to 18d also include driver circuits.

The cylindrical rotator 2 is supported by a rotation shaft 3 in the hollow tubular stator 1, and rotated by a motor (not illustrated) around the rotation shaft 3.

The rotator communication apparatus 200 is configured of a stator-specific communication device 6 and stator-specific antennas 4a to 4d, which are attached to the stator 1, rotator-specific communication devices 7a to 7d and rotator-specific antennas 5a to 5d, which are attached to the rotator 2, and a monitor 55.

The stator 1, the rotator 2, and the rotation shaft 3 include conductors.

The stator-specific communication device 6 includes a transmitter/receiver 8, a power combiner/splitter 9, a phase shift controller 10, a memory 11, and phase shifters 12a to 12d.

A table and equations for setting the phase angles of signals exchanged between the stator-specific communication device and the rotator-specific communication devices are stored in the memory 11.

The rotator-specific communication devices 7a to 7d respectively include transmitter/receivers 13a to 13d and received signal strength indicators 14a to 14d.

The transmitter/receiver 8 of the stator-specific communication device 6 upconverts a control signal input from the controller 16 and converts the control signal into a high frequency control signal.

A control signal to each power device is unique. Therefore, the control signal is carried as a high frequency control signal of different carrier frequencies.

The plurality of converted high frequency control signals is split by the power combiner/splitter 9. The split high frequency control signals are respectively in a state of having a plurality of carrier frequencies.

These high frequency control signals are respectively phase shifted by predetermined amounts by the phase shifters 12a to 12d, and input into the stator-specific antennas 4a to 4d. The phase shift amount $\Phi$ at the phase shifters 12a to 12d is expressed by Mathematical Formula 1 and Mathematical Formula 2, and controlled by the phase shift controller 10.

[Mathematical Formula 1]

$$\Phi = (\phi_a \phi_b \phi_c \phi_d) \quad \text{(Mathematical Formula 1)}$$

The phase shift amount $\Phi$ is set here corresponding to a current rotation angle $\alpha$ measured by a rotary encoder 15 with the rotation angle $\alpha$ recorded in the memory 11 and a phase shift amount table $\Psi(\alpha)$ expressed below.

[Mathematical Formula 2]

$$\Psi(\alpha) = (\psi_a(\alpha)\psi_b(\alpha)\psi_c(\alpha)\psi_d(\alpha)) \quad \text{(Mathematical Formula 2)}$$

The high frequency control signals emitted from the stator-specific antennas 4a to 4d are received by the rotating rotator-specific antennas 5a to 5d. The received high frequency control signals are respectively input into the transmitters/receivers 13a to 13d of the rotator-specific communication devices 7a to 7d, converted back into the control signals, and input into the power devices 18a to 18d via the drive circuits.

Here, in terms of the signals input into the transmitters/receivers 7a to 7d, signal strength S of Mathematical Formula 3 illustrated below is detected in the received signal strength indicators 14a to 14d.

[Mathematical Formula 3]

$$S = (S_a S_b S_c S_d) \quad \text{(Mathematical Formula 3)}$$

The detected signal strength information is converted into high frequency signals and transmitted, as sensing signals together with each piece of information indicating the operating states and the like of the power devices 18a to 18d, from the transmitters/receivers 13a to 13d to the rotator-specific antennas 5a to 5d.

If the signal strength S is not detected by the received signal strength indicators 14a to 14d, information indicating no-detection is transmitted.

Moreover, these high frequency sensing signals have different carrier frequencies from the above-mentioned high frequency control signals. Accordingly, they can be separated by filters in the transmitters/receivers 8 and 13a to 13d so that there is no interference.

The high frequency sensing signals emitted from the rotating rotator-specific antennas 5a to 5d are received by the stator-specific antennas 4a to 4d. These high frequency sensing signals are phase shifted by the same amounts as the above-mentioned amounts by the phase shifters 12a to 12d, combined by the power combiner/splitter 9, and input into the transmitter/receiver 8.

The input high frequency sensing signal is converted back into the sensing signal. The pieces of information indicating the operating states and the like of the power devices 18a to 18d are transmitted to the controller 16 to use for control signal generation. The signal strength information is transmitted to the phase shift controller 10 and the memory 11. The table is updated if necessary. Rotation is repetitive movement and the number of times required to acquire the table needs to be small.

For example, the table is acquired for a predetermined time period, a predetermined number of rotations, or a predetermined number of times upon startup of the rotator communication apparatus. The phase angle of a signal is simply required to be adjusted based on the recorded information afterward.

Alternatively, a command from a higher level system such as a wind power generation system may be set as a trigger, or the table may be acquired at regular intervals.

Upon startup of the system, it is also effective to acquire the table in a state where the power devices are isolated. The high frequency control signal and the high frequency sensing signal here use, for example, the 2.4 GHz band. Accordingly, it is possible to improve the immunity of communication quality to switching noise of an inverter having a frequency region of up to approximately 500 MHz and magnetic field noise of a motor.

Furthermore, antennas used use resonance and accordingly have characteristics of a bandpass filter. Therefore, the above noise immunity can be further improved.

Moreover, the monitor 55 is connected to the phase shift controller 10. An operator can visually check information on the rotation angle, amount of phase shift, and received signal strength.

Frequency-division multiplexing was used here as the signal multiplexing method for description. However, the possibilities of time-division multiplexing and code-division multiplexing are not denied. Furthermore, the signal modulation method places prime importance on the real time property. Accordingly, analog modulation such as AM (Amplitude Modulation) modulation and FM (Frequency Modulation) modulation is effective. Most of all, FM modulation having high noise immunity is desirable. Moreover, a desired data rate and communication delay are different between the control signal and the sensing signal. Therefore, different modulation methods may be used bidirectionally. The stator-specific antennas 4a to 4d and the rotator-specific antennas 5a to 5d are arranged concentrically with the rotation shaft 3 as the center, facing each other.

The stator 1, the rotator 2, and the rotation shaft 3 are made of conductors, and a complicated multipath environment is formed in the stator 1 due to multiple reflections. Therefore, it is very difficult to stably transmit the high frequency signals between the stator-specific antennas 4a to 4d and the rotator-specific antennas 5a to 5d, and changes in signal strength occur also during rotation.

Especially, if the conductive housing is large with respect to the wavelength of a radio wave used, the multipath environment becomes more complicated. For example, signals received by the rotator-specific antenna 5a are combinations of direct waves and reflected waves (first reflection, second reflection, . . . ) of signals output by the stator-specific antennas 4a to 4d. A change in signal strength occurs depending on the positional relationship of each antenna, a distance to the conductor, and the like. If the signal strength is weak, the communication quality is degraded.

However, if the phase angles of signals emitted from a plurality of antennas are changed as described above, the magnitude of signal strength is controlled, and stable, continuous communication becomes possible also during rotation.

Moreover, the power devices 18a to 18d operate at high voltages, and are turned on/off at their own timings.

Therefore, insulation is essential between the power devices, and the power devices 18a to 18d are separated a minimum creepage distance or greater away, the minimum creepage distance being specified in a safety standard (for example, JISC1010-1). This is the standard for preventing the occurrence of what is called a creeping discharge, which is the formation of a dendritic discharge path along the surface of a dielectric by a corona discharge or spark discharge when there are two electrodes at the gas-dielectric boundary.

A creeping discharge generally occurs at a shorter distance between the electrodes and a lower applied voltage than a space discharge. Accordingly, the creeping discharge is an important design item. The creeping discharge can also be reduced by covering the stator-specific antennas 5a to 5d with a dielectric material.

Candidates for the dielectric material include a solder resist material and a silicon coating material. The example was described here in which four stator-specific antennas and four rotator-specific antennas are used. However, the effect can be produced with two or more stator-specific antennas and one or more rotator-specific antennas.

Figure 2:
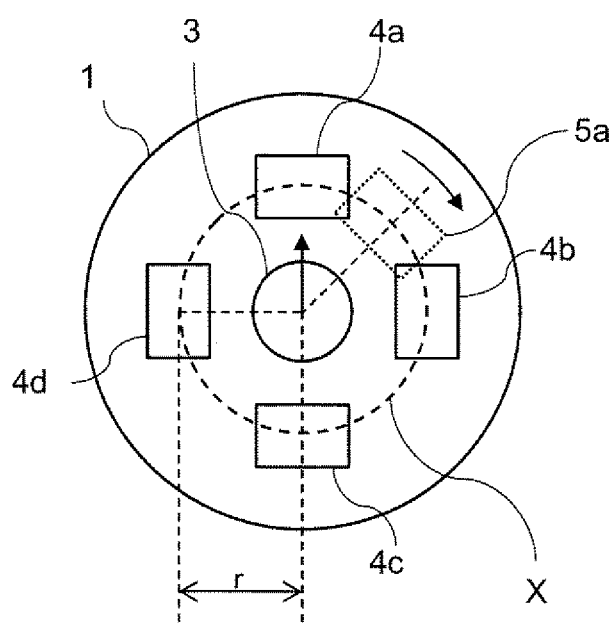
FIG. 2 is a perspective view of a stator 1 according to the first embodiment, as viewed from the length direction of a rotation shaft 3.

FIG. 2 is a perspective view of the stator 1 as viewed from the length direction of the rotation shaft 3.

For simplification of description, only one rotator-specific antenna 5a is illustrated.

Moreover, the stator-specific antennas 4a to 4d and the rotator-specific antenna 5a are arranged concentrically with a distance r from the center of the rotation shaft 3 as the radius. A planar antenna such as a patch antenna configured of a printed board is used for the antenna to reduce the centrifugal load.

Figure 3:
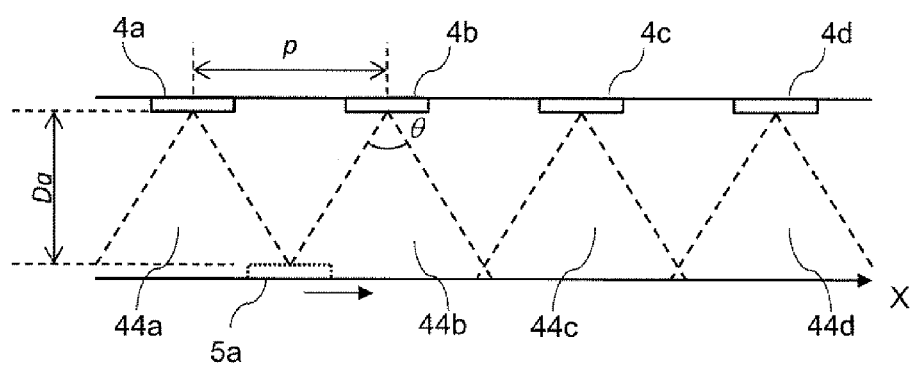
FIG. 3 is an exploded view of a curved surface of a cylinder having a circumference X and a height of a distance Da between antennas, according to the first embodiment.

FIG. 3 is an exploded view of a curved surface of a cylinder having the circumference X and a height of a distance Da between antennas. The stator-specific antennas 4a to 4d respectively include radiation regions 44a to 44d with a beam half width θ.

The radiation regions are set to touch. Accordingly, it can be seen that even if moving in the X direction, the rotator-specific antenna 5a is always within the radiation regions 44a to 44d, and direct waves are covered.

In order to cover the entire circumference with the stator-specific antennas, N stator-specific antennas expressed by Mathematical Formula 4 are required.

In order to reduce the centrifugal load, the distance r can be reduced to a degree the antenna characteristics are not significantly degraded due to the influence of the conductor of the rotation shaft 3.

[Mathematical Formula 4]

$$N \geq \frac{\pi r}{D_a \tan\left(\frac{\theta}{2}\right)} \quad \text{(Mathematical Formula 4)}$$

Moreover, when a space p between the stator-specific antennas is a one-half wavelength or longer, the correlation of a signal between antennas is reduced, and the effect of phase angle control is increased.

The description was given here taking the patch antenna as an example. However, a lens antenna that concentrates a beam to increase signal strength, or a rod antenna that allows a reduction in footprint, a leaky coax using a leaky wave, and the like can also be used.

The process of phase angle control between the stator-specific communication device and the rotator-specific communication device in the embodiment is described with reference to FIGS. 4 and 5.

Figure 4:
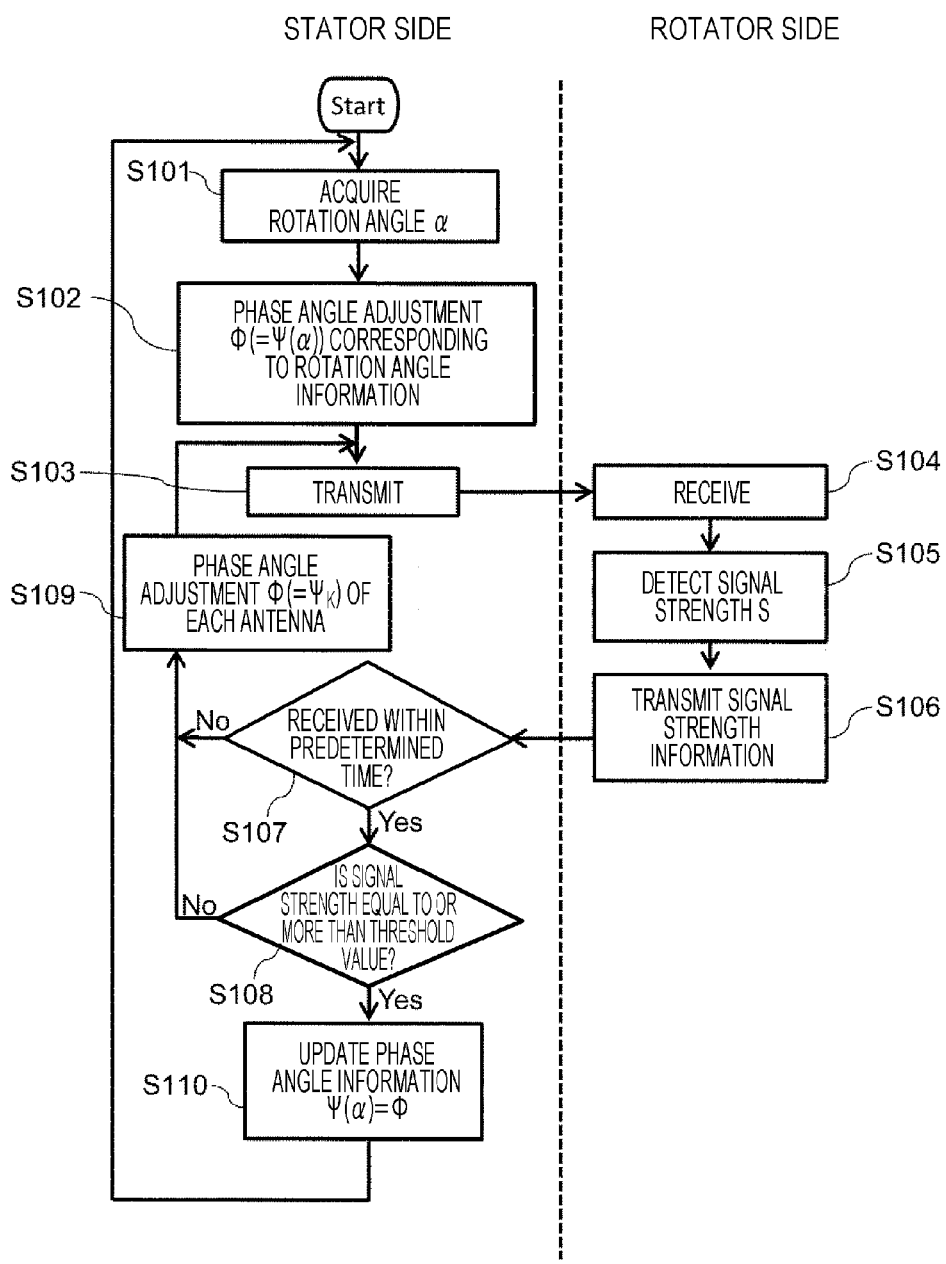
FIG. 4 is a flowchart explaining the process of controlling the phase angles of signals exchanged between a stator-specific communication device and a rotator-specific communication device, according to the first embodiment.

FIG. 4 is a flowchart explaining the process of phase angle control between the stator-specific communication device and the rotator-specific communication device.

FIG. 5 is a diagram illustrating an example of combinations of phase shift amounts.

In the stator-specific communication device 6, the phase shift controller 10 acquires the rotation angle α from the rotary encoder 15 (S101).

The phase shift controller 10 reads, from the memory 11, the phase shift amount 'Ψ'(α) corresponding to the acquired rotation angle information, and controls the phase shifters 12a to 12d to have the phase shift amount Φ=Ψ(α) (S102).

In the initial state, k=1 in FIG. 5 is stored in the table of the phase shift amounts of the total angle of rotation.

In other words, the phase angle is not adjusted in each phase shifter. The transmitter/receiver 8 upconverts a control signal input from the controller 16, converts the control signal into high frequency control signal, and transmits the high frequency control signal via the power combiner/splitter 9 and the stator-specific antennas 4a to 4d (S103).

The transmitters/receivers 13a to 13d of the rotator-specific communication devices 7a to 7d receive the high frequency control signals from the rotator-specific antennas 5a to 5d (S104).

The received signal strength indicators 14a to 14d detects the signal strength S of the high frequency control signals (S105). The detected signal strength information is converted into high frequency signals, and input, as sensing signals together with each piece of information indicating the operating states and the like of the power devices 18a to 18d, from the transmitters/receivers 13a to 13d to the transmitter/receiver 8 via the rotator-specific antennas 5a to 5d, the stator-specific antennas 4a to 4d, and the power combiner/splitter 9.

At this point in time, if the signal strength S is smaller than the minimum sensitivities of the transmitters/receivers 13a to 13d and 8, and the signals are not received within an expected time (S107), or if the signal strength S is equal to or less than a threshold value (S108), the phase shift controller 10 changes the phase shift amount Φ of the phase shifters 12a to 12d (S109), and transmits high frequency control signals again (S103).

At this point in time, the phase shift amount Φ is selected from k=2 to 19 of FIG. 5 in such a manner as that each amount of change in phase shift amount is a minimum.

The phase shift amount Φ may be selected in ascending order from k=2, or may be selected randomly.

The threshold value here is greater than noise strength in the rotator communication apparatus and is determined by the communication quality required by the rotator communication apparatus 200. If high communication quality is required, a margin from the noise strength in the rotator communication apparatus is set to be large.

Moreover, the reason that ψak=0 is fixed is as follows:

The high frequency control signal from the stator-specific antenna 4a is received by the rotator-specific antenna 5a through a plurality of propagation paths due to multiple reflections in the stator. In other words, interference occurs between a direct wave and a plurality of reflected waves. The interference always occurs even if yak is set to any value of 0 to 360 degrees. Therefore, it is acceptable to fix ψak=0.

Naturally, the value of ψak may be set to a value other than zero, and may be any value within a range of 0 to 360 degrees.

If the transmitter/receiver 8 receives a signal equal to or more than the threshold value within the predetermined time, the phase shift amount Φ used at that time is updated as the table Ψ(α) of the phase shift amounts in the memory 11 (S110). The processing returns to the flow of the acquisition of the rotation angle (S101).

As described above, a series of flows is complete when the prescribed predetermined time period, number of rotations, number of times end, or when a higher level system issues a command.

Moreover, if the rotational speed cannot be ignored with respect to the communication speed, means for measuring a delay amount until a signal from a communication device on the stationary side is detected by a signal strength indicator on the rotation side is provided to obtain further stability of signal strength.

Specifically, it is effective to calculate a rotation angle at the time of the detection of signal strength from the delay amount, rotation angle, and rotational speed, and adjust the phase angle of the signal based on the rotation angle or record the rotation angle in the memory.

Moreover, the combinations of the phase shift amounts of FIG. 5 are an example. The possibility of being capable of increasing the signal strength is increased when combinations of phase shift amounts in smaller steps in a wider angle range are used.

Conversely, if the number of combinations of phase shift amounts is smaller, the required time for the series of flows can be reduced. In this manner, a selection can be made in accordance with system requirements such as the real time property and the communication quality.

Moreover, the propagation characteristics of the high frequency control signals transmitted from the stator-specific antennas 4a to 4d to the rotator-specific antennas 5a to 5d and the propagation characteristic of the high frequency sensing signals transmitted from the rotator-specific antennas 5a to 5d to the stator-specific antennas 4a to 4d are totally the same due to the reciprocity theorem of the antenna. Accordingly, assuming that the performance of the transmitters/receivers 8 and 13a to 13d is the same, the received signal strength indicator is required to be arranged in either the stator-specific communication device 6 or the rotator-specific communication devices 7a to 7d.

In the rotator communication apparatus 200 of the embodiment, the highest priority is given to the communication quality of the control signal. Accordingly, a description was given of that the received signal strength indicators 14a to 14d are arranged in the rotator-specific communication devices 7a to 7d. In reality, the propagation characteristics and the transmitter/receiver performance are not ideal unlike the above description. Accordingly, causing also the transmitter/receiver 8 to have the function of observing received signal strength, and judging in S108 of FIG. 4 whether both the signal strength and signal strength at the received signal strength indicators 14a to 14d are equal to or more than the threshold value lead to the increase of the accuracy of the phase angle control, which is effective.

Figure 6:
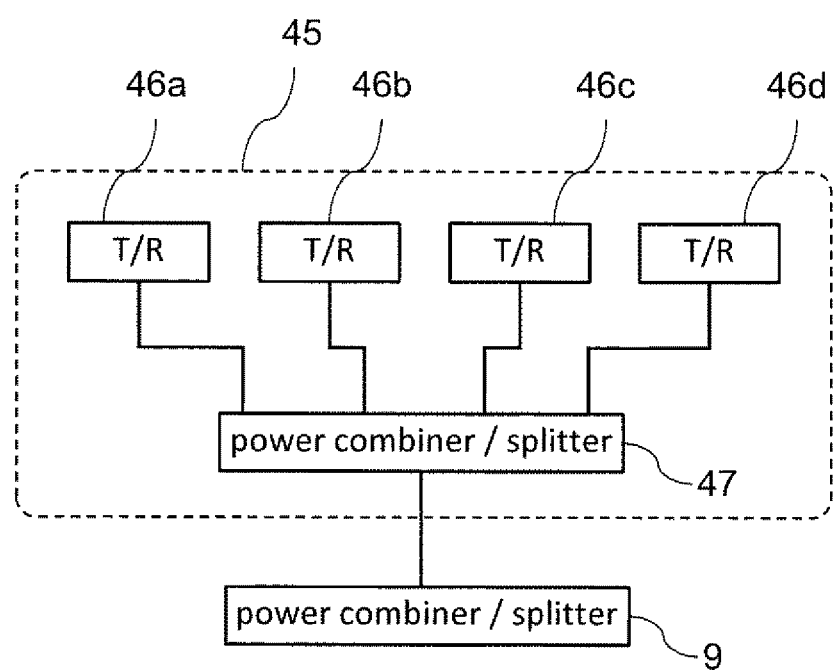
FIG. 6 is a modification of a transmitter/receiver 8 according to the first embodiment.
Figure 7:
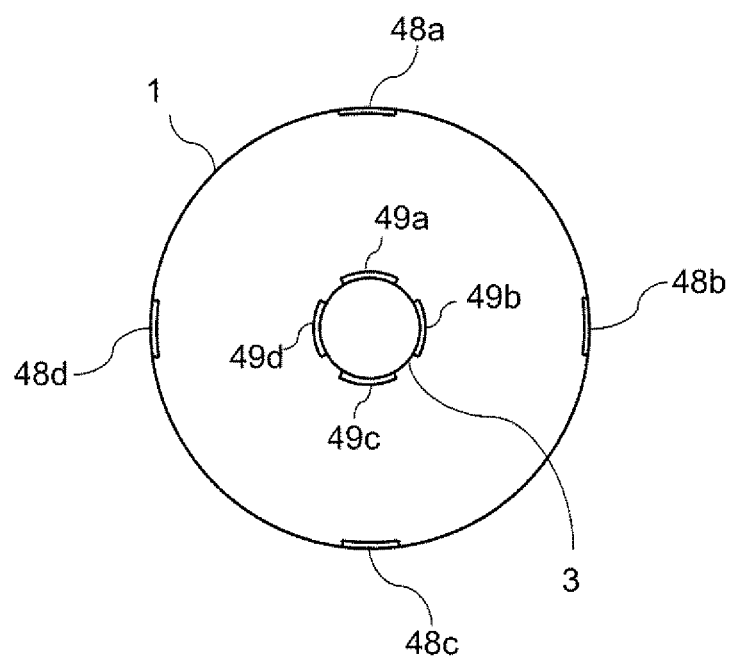
FIG. 7 is a diagram illustrating a modification of the rotator communication apparatus 200 according to the first embodiment.

FIG. 6 is a modification of the transmitter/receiver 8 on the stator side in the embodiment. A stator-specific transmitter/receiver 45 is configured of transmitters/receivers 46a to 46d and a power combiner/splitter 47.

In the drawing, connections between the transmitters/receivers 46a to 46d, and the controller 16 and the phase shift controller 10 are omitted. Individual control signals for the power devices are input from the controller 16 into the transmitters/receivers 46a to 46d.

The transmitters/receivers 46a to 46d upconvert these control signals to convert into high frequency control signals. As described above, these high frequency control signals are configured respectively of different carrier frequencies. The plurality of converted high frequency control signals is combined temporarily at the power combiner/splitter 47 and is split again by the power combiner/splitter 9.

Therefore, the output of the power combiner/splitter 9 is generated by mixing the plurality of high frequency control signals. Consequently, the transmitter/receiver 8 can have a simple configuration.

In the embodiment, a description was given arranging the antennas on the flat portions of the cylindrical rotator and stator. However, the antennas can also be attached to the curved surface of the cylinder as in FIG. 7. The stator-specific antennas 48a to 48d are arranged on the curved surface portion of the stator 1 with equal angular space therebetween. The rotator-specific antennas 49a to 49d are arranged on the curved surface portion of the rotator 3 with equal angular space therebetween. Space for the antennas can be saved, and it is means that can solve the problems of the arrangement space and heat dissipation of components such as a motor in the stator.

Moreover, the embodiment can use a linearly or circularly polarized wave regardless of the polarization direction of each antenna.

In a case where the linearly polarized wave is used, as in a fifth embodiment described below, it is desirable to cause the polarization direction to substantially agree with the radiation direction with the rotation shaft as the center, and arrange the antennas concentrically at equal angles.

In a case of the circularly polarized wave, a design is desired in which consideration is given to the influence of a neighboring conductor in order to prevent the deterioration of the axial ratio.

A modification of the rotator communication apparatus 200 according to the embodiment is described with reference to FIGS. 8 and 9.

Figure 8:
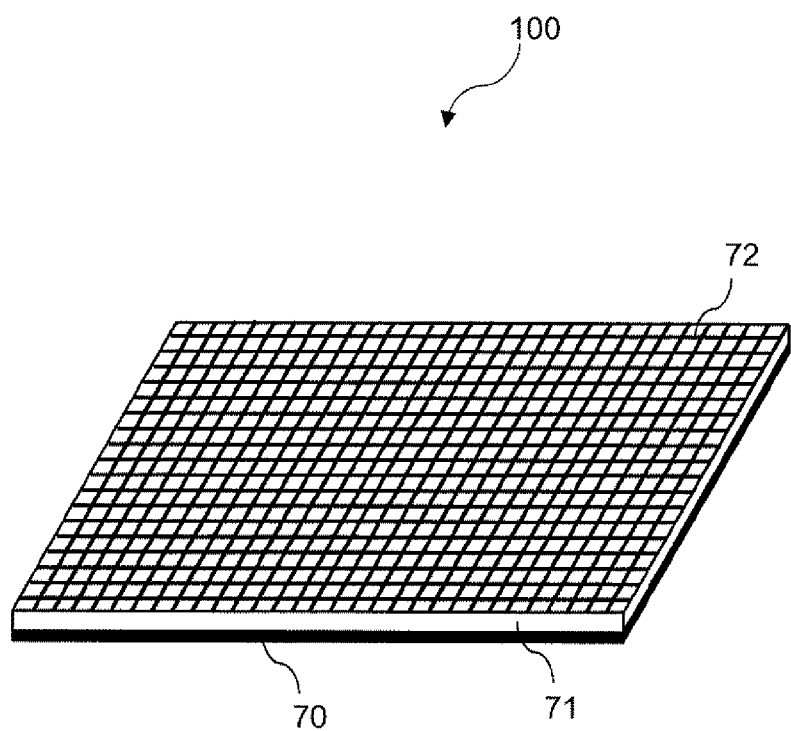
FIG. 8 is a diagram illustrating a planar propagation medium 100 used for an antenna according to the first embodiment.
Figure 9:
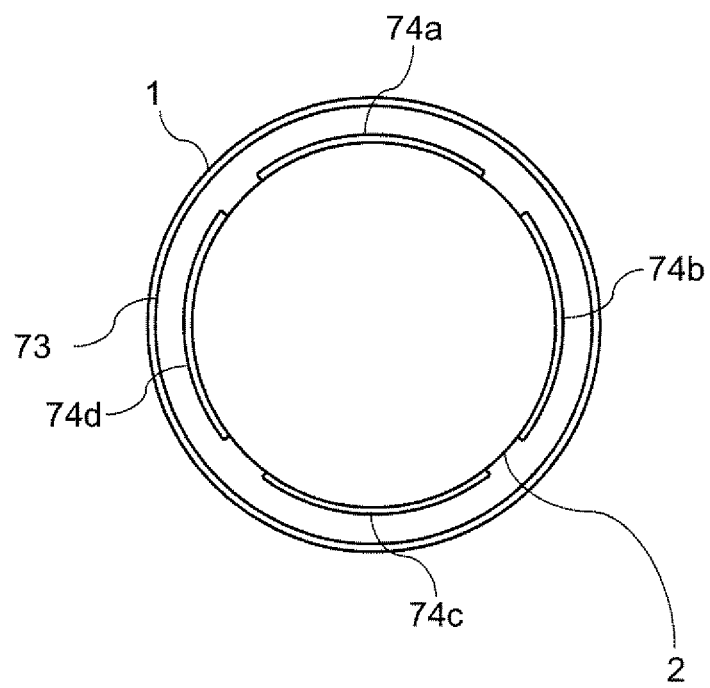
FIG. 9 is a diagram illustrating a modification of the rotator communication apparatus 200 using the planar propagation medium 100, according to the first embodiment.

FIG. 8 is a diagram illustrating a planar propagation medium 100 used for the rotator communication apparatus 200.

In the planar propagation medium 100, a planar dielectric 71 is sandwiched between a planar conductor 70 and a planar mesh conductor 72, and it is made possible to transmit electromagnetic waves therebetween, and also exchange electromagnetic energy contactlessly via an evanescent wave exuding in the vicinity of the planar mesh conductor 72. The planar mesh conductor 72 expands in grid form, and the pitch of the mesh can control the exuding amount of an electromagnetic wave to the outside. The electromagnetic wave exuding to the outside, called the evanescent wave, is attenuated exponentially in relation to the propagation distance.

The distance that the amplitude is attenuated to 1/e is typically approximately 1 cm (e: the base of a natural logarithm). Therefore, electromagnetic waves are localized only in the vicinity of the planar mesh conductor 72, and unnecessary radiation to the outside can be extremely reduced. Moreover, an interfering wave from the outside hardly has an influence due to the reciprocity theorem of a radiating element. The planar dielectric 71 is desired to be a low dielectric constant and dielectric tangent material when consideration is given to propagation efficiency.

The end surface of the planar propagation medium 100 has an open structure in the diagram. However, the end surface is desired to be an end covered with a radio wave absorber.

Moreover, the planar propagation medium 100 can have flexibility by making its entire thickness thinner. FIG. 9 is a diagram illustrating a modification of the rotator communication apparatus 200 using the planar propagation medium 100. A stator-specific planar propagation medium 73 is arranged on the curved surface portion of the stator 1. Rotator-specific planar propagation media 74a to 74d are arranged on the curved surface portion of the rotator 2 with equal angular space therebetween.

With the modification, it becomes possible to exchange signals between the stator-specific planar propagation medium 73 and the rotator-specific planar propagation media 74a to 74d via evanescent waves. Furthermore, unnecessary radiation to the outside can be extremely reduced.

The stator-specific planar propagation medium 73 is simply required to face the rotator-specific planar propagation media 74a to 74d. Accordingly, a similar effect can be obtained even if they are mounted on the flat portions of the stator 1 and the rotator 2.

Figure 10:
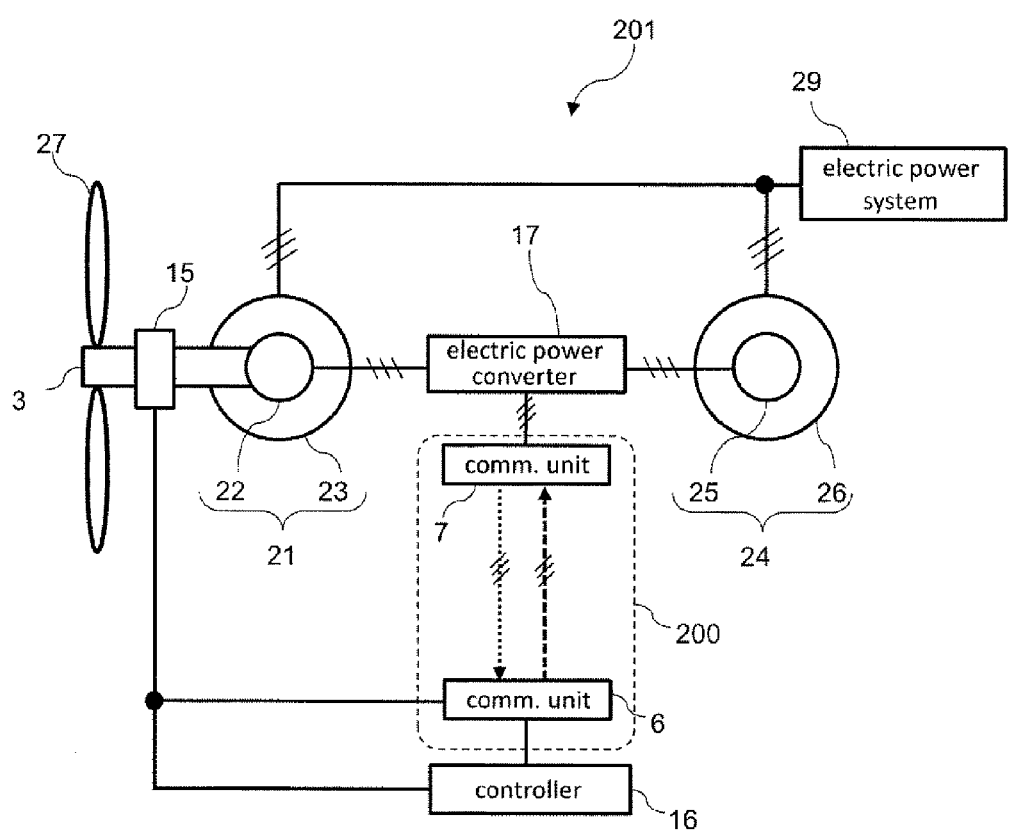
FIG. 10 is a configuration diagram of a wind power generation system 201 using the rotator communication apparatus 200 according to the first embodiment.

FIG. 10 is a configuration diagram of the wind power generation system 201 using the rotator communication apparatus 200 according to the embodiment.

A main generator 21 including a rotor 22 and a stator 23 is connected to an auxiliary generator 24 including a rotor 25 and a stator 26, via the electric power converter 17.

The electric power of an electric power system 29 is applied to the stator 26 of the auxiliary generator 24. The power is then supplied to the rotor 25 by the principle of the synchronous generator.

The electric power converter 17 subsequently supplies the power the power whose voltage and frequency have been converted to the rotor 22 of the main generator 21 to perform a power generation operation. Consequently, the wind power generation system 201 can convert wind energy received by a blade 27 into electric energy to transmit to the electric power system 29.

In the configuration, the electric power converter 17 is attached to the rotors 22 and 25. Accordingly, the electric power converter 17 rotates with the rotation of the rotors. The electric power converter 17 needs to be controlled in accordance with the rotation of the blade 27. Accordingly, the rotator communication apparatus 200 receives a control signal brushlessly.

Furthermore, a control signal is generated from various pieces of sensing information on the rotor side. Accordingly, the control signals and sensing information are exchanged bidirectionally.

A circuit breaker may be provided in parallel with the electric power converter 17. Consequently, the electric power converter 17 can be protected from excessive power applied at the time of a system failure. Moreover, the embodiment can also be applied to a system to which a gearbox has been added.

Moreover, a more reliable wind power generation system can be achieved by placing a plurality of the rotor communication apparatuses 200 in parallel, or placing in parallel a plurality of the stator-specific communication devices 6 or rotor-specific communication devices 7 configuring the rotor communication apparatus 200.

As described above, the rotator communication apparatus 200 according to the embodiment is used in wireless communication between the rotor and the stator, and can perform stable, continuous communication also during rotation even under a complicated multipath environment due to multiple reflections in the conductive housing. Therefore, one-to-N communication and two-way communication can be achieved.

Moreover, the first embodiment example is applied to a wind power generation system. Accordingly, a wind power generation system without a brush can be achieved which facilitates maintenance and can improve power generation efficiency.

Moreover, according to the embodiment, the rotator communication apparatus 200 can transmit high frequency signals. Accordingly, it is possible to improve the immunity of communication quality to switching noise of an inverter having a frequency region of up to approximately 500 MHz and magnetic field noise of a motor.

Furthermore, antennas used use resonance and accordingly have characteristics of a bandpass filter. Therefore, the above noise immunity can be further improved.

Second Embodiment

Hereinafter, a rotator communication apparatus according to a second embodiment of the present invention is described with reference to FIG. 11.

Figure 11:
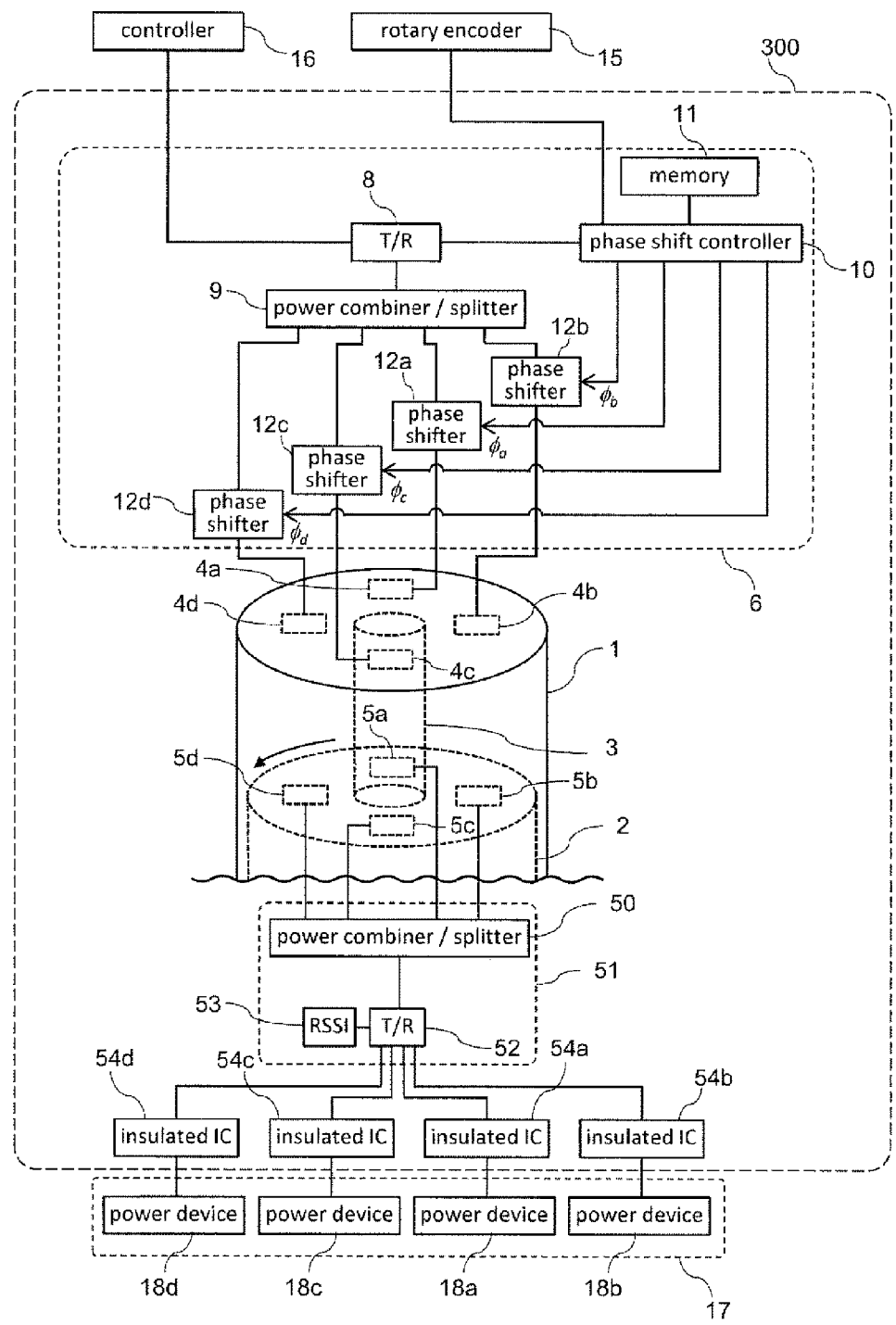
FIG. 11 is a block diagram illustrating the configuration of a rotator communication apparatus 300 according to a second embodiment.

FIG. 11 is a block diagram illustrating the configuration of a rotator communication apparatus 300. A portion where antennas are mounted is illustrated by a perspective view to facilitate the understanding of the arrangement of the antennas.

The rotator communication apparatus 300 is configured of the stator-specific communication device 6 and the stator-specific antennas 4a to 4d, which are attached to the stator 1, a rotator-specific communication device 51 and the rotator-specific antennas 5a to 5d, which are attached to the rotator 2, and insulated ICs (Integrated Circuit) 54a to 54d.

The rotator-specific communication device 51 includes a power combiner/splitter 50, a transmitter/receiver 52, and a received signal strength indicator 53. High frequency control signals received by the rotating rotator-specific antennas 5a to 5d are combined by the power combiner/splitter 50 of the rotator-specific communication device 51. The signal is then input into the transmitter/receiver 52. In the transmitter/receiver 52, the signal is converted back into the control signal of each power device.

These control signals are input into the insulated ICs 54a to 54d, and input into the power devices 18a to 18d via the drive circuits. A photocoupler or transformer is used for the insulated IC. Each power device requires two insulated ICs for two-way communication depending on the configuration of a peripheral circuit.

Here, the signal strength S of the signal input into the transmitter/receiver 52 is detected at the received signal strength indicator 53. The detected signal strength information is transmitted from the transmitter/receiver 52 to the rotator-specific antennas 5a to 5d, as sensing signals together with each piece of information indicating the operating states and the like of the power devices 18a to 18d, while being converted into a high frequency signal and split by the power combiner/splitter 50. If the signal strength is not detected at the received signal strength indicator 53, information indicating no-detection is transmitted.

Moreover, these high frequency sensing signals have different carrier frequencies from the high frequency control signals. Accordingly, they can be separated by filters in the transmitters/receivers 8 and 52 so that there is no interference.

If the phase angles of signals emitted from a plurality of antennas are changed as described above, the magnitude of signal strength is controlled, and stable, continuous communication becomes possible also during rotation. Furthermore, signals of the rotator-specific antennas are bundled by the power combiner/splitter 50 so that the phase angle control is facilitated. Moreover, insulation between the power devices 18a to 18d is ensured by the insulated ICs. However, consideration needs to be given to a creeping discharge. It is desirable to separate the power devices 18a to 18d a minimum creepage distance or greater away, the minimum creepage distance being specified in a safety standard (for example, JISC1010-1).

The example was described here in which four stator-specific antennas and four rotator-specific antennas are used. However, the effect can be produced with two or more stator-specific antennas and two or more rotator-specific antennas.

As described above, the rotator communication apparatus 300 according to the second embodiment is used in wireless communication between the rotor and the stator, and can perform stable, continuous communication also during rotation even under a complicated multipath environment due to multiple reflections in the conductive housing. Therefore, one-to-N communication and two-way communication can be achieved.

Moreover, according to the second embodiment, the number of rotator-specific communication devices can be minimized so that reductions in size and cost can be promoted.

Moreover, according to the second embodiment, signals of the rotator-specific antennas are bundled by the power combiner/splitter so that the phase angle control is facilitated.

Third Embodiment

Figure 12:
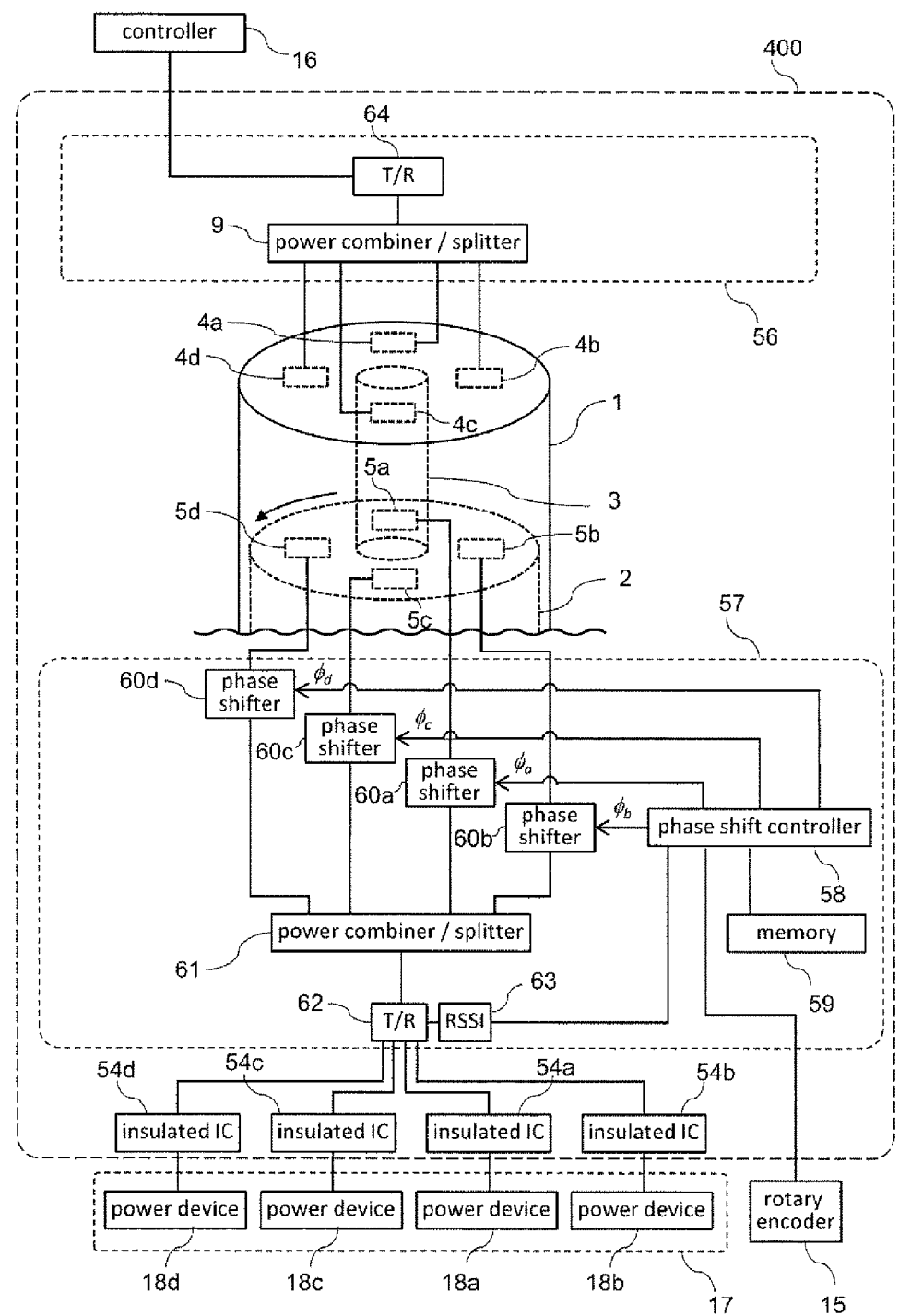
FIG. 12 is a block diagram illustrating the configuration of a rotator communication apparatus 400 according to a third embodiment.

Hereinafter, a rotator communication apparatus according to a third embodiment of the present invention is described with reference to FIGS. 12 and 13. FIG. 12 is a block diagram illustrating the configuration of a rotator communication apparatus 400.

A portion where antennas are mounted is illustrated by a perspective view to facilitate the understanding of the arrangement of the antennas. The rotator communication apparatus 400 is configured of a stator-specific communication device 56 and the stator-specific antennas 4a to 4d, which are attached to the stator 1, a rotator-specific communication device 57 and the rotator-specific antennas Sato 5d, which are attached to the rotator 2, and the insulated ICs 54a to 54d.

The stator-specific communication device 56 includes a transmitter/receiver 64 and the power combiner/splitter 9. The rotator-specific communication device 57 includes a phase shift controller 58, a memory 59, phase shifters 60a to 60d, a power combiner/splitter 61, a transmitter/receiver 62, and a received signal strength indicator 63.

A table and equations for setting the phases of signals exchanged between the stator-specific communication device and the rotator-specific communication device are stored in the memory 59.

The transmitter/receiver 64 of the stator-specific communication device 56 upconverts a control signal input from the controller 16 to convert into a high frequency control signal. A control signal to each power device is unique. Therefore, the control signal is carried as a high frequency control signal of different carrier frequencies.

The plurality of converted high frequency control signals is split by the power combiner/splitter 9 and input into the stator-specific antennas 4a to 4d.

The high frequency control signals emitted from the stator-specific antennas 4a to 4d are received by the rotating rotator-specific antennas 5a to 5d.

The received high frequency control signals are respectively phase shifted by predetermined amounts by the phase shifters 60a to 60d, and combined by the power combiner/splitter 61. The phase shift amount $\Phi$ at the phase shifters 60a to 60d is controlled by the phase shift controller 58.

The phase shift amount $\Phi$ is set here corresponding to a current rotation angle $\alpha$ measured by the rotary encoder 15 with the rotation angle $\alpha$ recorded in the memory 59 and the phase shift amount table $\Psi(\alpha)$.

The combined high frequency control signal is input into the transmitter/receiver 62, converted back into the control signal, and input through the insulated ICs 54a to 54d into the power devices 18a to 18d via the drive circuits.

Here, the signal strength S of the signal input into the transmitter/receiver 62 is detected at the received signal strength indicator 63. The detected signal strength information is transmitted to the phase shift controller 58 and the memory 59, and the table is updated if necessary.

The sensing signals of the power devices 18a to 18d are converted into a high frequency signal by the transmitter/receiver 62, and split by the power combiner/splitter 61. The high frequency signals are respectively phase shifted by predetermined amounts by the phase shifters 60a to 60d and transmitted to the rotator-specific antennas 5a to 5d.

The high frequency sensing signals emitted from the rotating rotator-specific antennas 5a to 5d are received by the stator-specific antennas 4a to 4d. These high frequency sensing signals are combined by the power combiner/splitter 9 and input into the transmitter/receiver 64.

The input high frequency sensing signal is converted back into the sensing signal, and each piece of information indicating the operating states and the like of the power devices 18a to 18d is transmitted to the controller 16 to use for control signal generation.

If the phase angles of signals received by a plurality of antennas are changed as described above, the magnitude of signal strength is controlled, and stable, continuous communication becomes possible also during rotation. The example was described here in which four stator-specific antennas and four rotator-specific antennas are used. However, the number of stator-specific antennas may be one. In that case, the power combiner/splitter 9 is not required. Moreover, the effect can be produced with two or more rotator-specific antennas.

Figure 13:
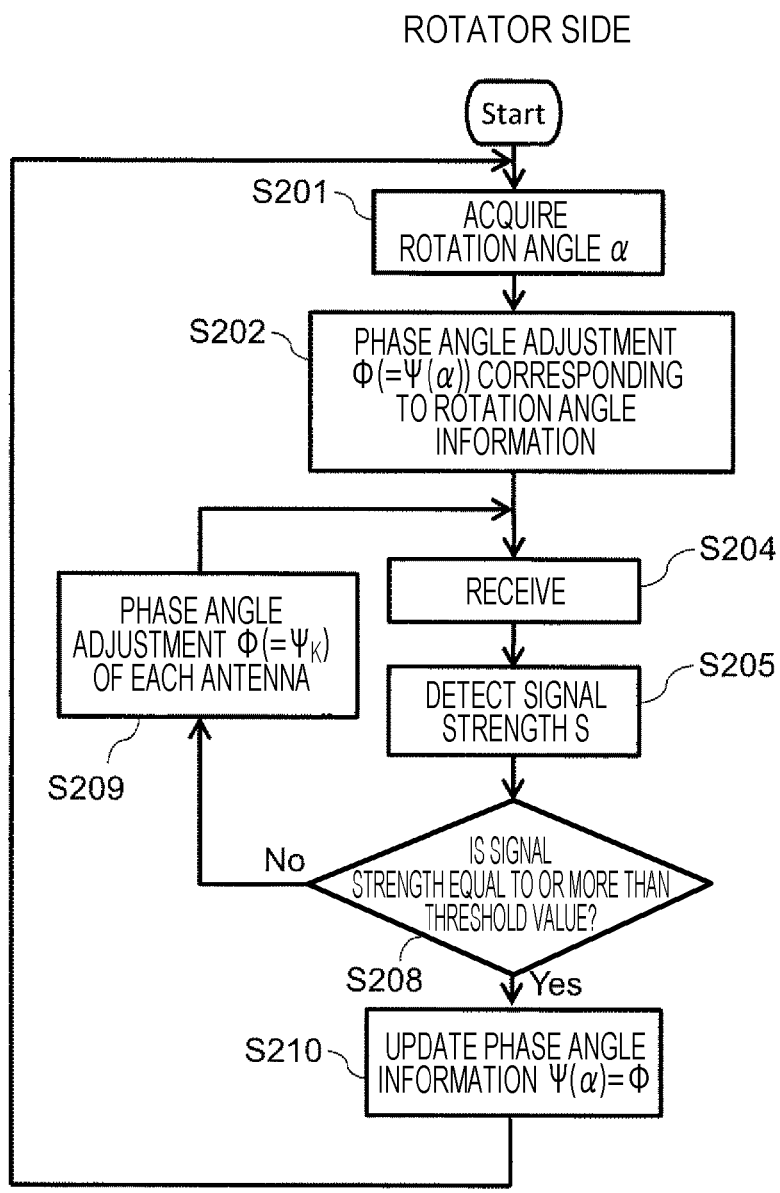
FIG. 13 is a flowchart explaining the process of controlling the phase angles of signals exchanged between a stator-specific communication device and a rotator-specific communication device, according to the third embodiment.

FIG. 13 is a flowchart explaining the process of the phase angle control between the stator-specific communication device and the rotator-specific communication device, according to the embodiment.

In the rotator-specific communication device 57, the phase shift controller 58 acquires the rotation angle $\alpha$ from the rotary encoder 15 (S201). The phase shift controller 58 reads, from the memory 11, the phase shift amount $\Psi(\alpha)$ corresponding to the acquired rotation angle information, and controls the phase shifters 60a to 60d to have the phase shift amount $\Phi=\Psi(\alpha)$ (S202).

In the initial state, k=1 in FIG. 5 is stored in the table of the phase shift amounts of the total angle of rotation.

In other words, the phase angle is not adjusted in each phase shifter. The transmitter/receiver 62 of the rotator-specific communication device 57 receives the high frequency control signals from the rotator-specific antennas 5a to 5d via the phase shifters 60a to 60d and the power combiner/splitter 61 (S204). The received signal strength indicator 63 detects the signal strength S of the high frequency control signal (S205).

If the detected signal strength S is equal to or less than a threshold value (S208), the phase shift controller 58 changes the phase shift amount $\Phi$ of the phase shifters 60a to 60d (S209), and receives a high frequency control signal again (S204).

If the transmitter/receiver 62 receives a signal equal to or more than the threshold value, the phase shift amount $\Phi$ used at that time is updated as the table $\Psi(\alpha)$ of the phase shift amounts in the memory 59 (S210). The processing returns to the flow of the acquisition of the rotation angle (S201).

A series of flows is complete when a prescribed predetermined time period, number of rotations, number of times end, or when a higher level system issues a command.

As described above, the rotator communication apparatus 400 according to the third embodiment is used in wireless communication between the rotator and the stator, and can perform stable, continuous communication also during rotation even under a complicated multipath environment due to multiple reflections in the conductive housing. Therefore, one-to-N communication and two-way communication can be achieved.

Moreover, according to the third embodiment, the phase shifters, the received signal strength indicator, and the rotary encoder are all arranged on the rotator side. Therefore, the phase shift amount, the signal strength, and the rotation angle can be recorded in the memory without time-lags, which enables more stable communication.

Moreover, according to the third embodiment, the number of stator-specific antennas can be minimized so that reductions in size and cost can be promoted.

Fourth Embodiment

Figure 14:
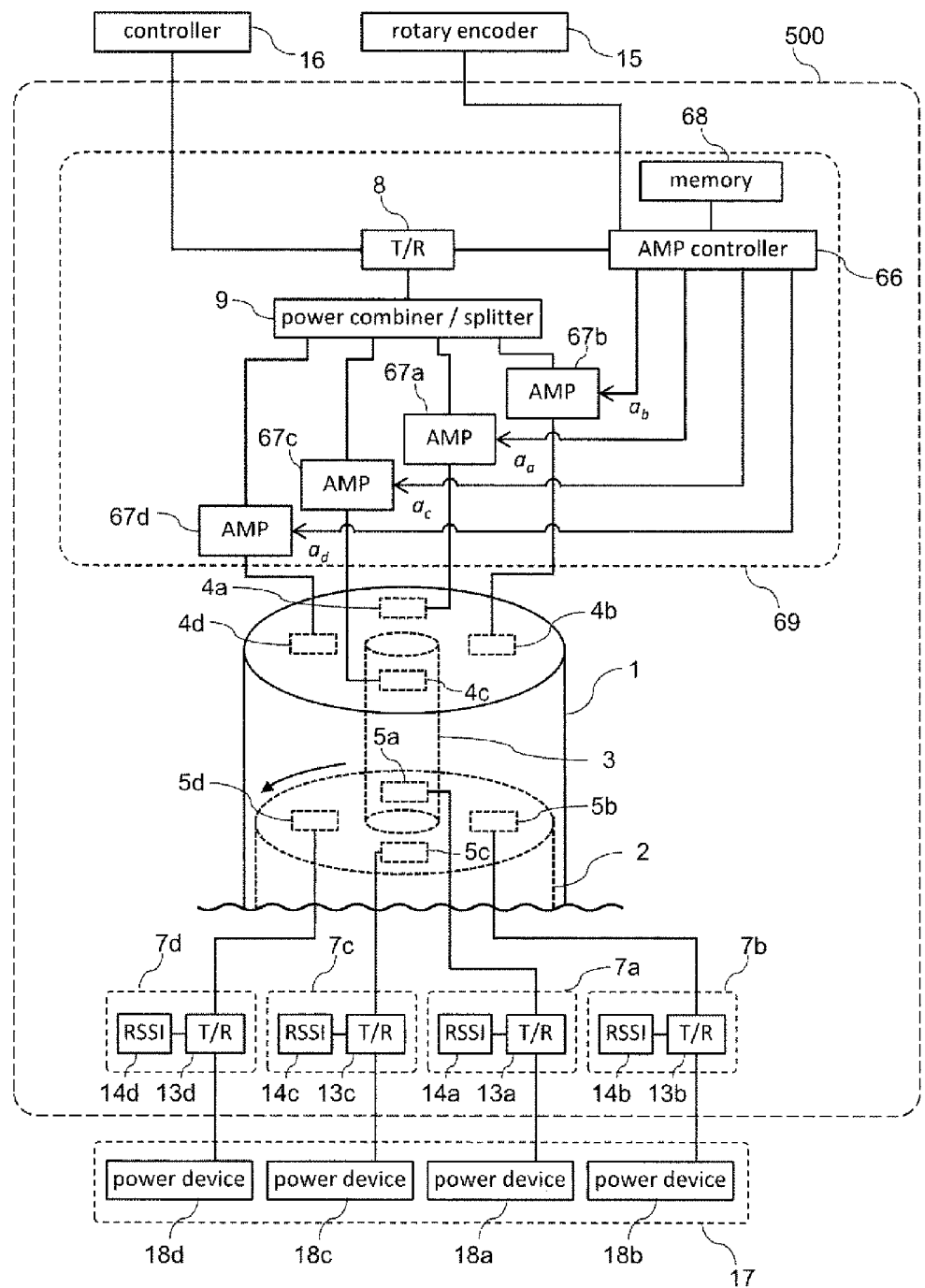
FIG. 14 is a block diagram illustrating the configuration of a rotator communication apparatus 500 according to a fourth embodiment.

Hereinafter, a rotator communication apparatus according to a fourth embodiment of the present invention is described with reference to FIGS. 14 to 16. FIG. 14 is a block diagram illustrating the configuration of a rotator communication apparatus 500.

A portion where antennas are mounted is illustrated by a perspective view to facilitate the understanding of the arrangement of the antennas.

The rotator communication apparatus 500 is configured of a stator-specific communication device 69 and the stator-specific antennas 4a to 4d, which are attached to the stator 1, and the rotator-specific communication devices 7a to 7d and the rotator-specific antennas 5a to 5d, which are attached to the rotator 2.

The stator-specific communication device 69 includes the transmitter/receiver 8, the power combiner/splitter 9, an amplifier controller 66, a memory 68, and phase shifters 67a to 67d. A table and equations for setting the amplitudes of signals are stored in the memory 68.

The transmitter/receiver 8 of the stator-specific communication device 69 upconverts a control signal input from the controller 16 and converts the control signal into a high frequency control signal. The plurality of converted high frequency control signals is split by the power combiner/splitter 9.

The amplitudes of these high frequency control signals are respectively adjusted by predetermined amounts by the amplifiers 67a to 67d. The high frequency controls signals are input into the stator-specific antennas 4a to 4d. Amplitude adjustment amount A at the amplifiers 67a to 67d is expressed by Mathematical Formula 5 and is controlled by the amplifier controller 66.

[Mathematical Formula 5]

$$A=(\alpha_a \alpha_b \alpha_c \alpha_d) \quad \text{(Mathematical Formula 5)}$$

The amplitude amount A is set here corresponding to a current rotation angle α measured by the rotary encoder 15 with the rotation angle α recorded in the memory 68 and Mathematical Formula 6 expressed below, in other words, a amplitude adjustment amount table E(α).

[Mathematical Formula 6]

$$E(\alpha)=(e_a(\alpha) e_b(\alpha) e_c(\alpha) e_d(\alpha)) \quad \text{(Mathematical Formula 6)}$$

Variable gain amplifiers may be applied to the amplifiers 67a to 67d, or high frequency switches will also do. The high frequency control signals emitted from the stator-specific antennas 4a to 4d are received by the rotating rotator-specific antennas 5a to 5d. The received high frequency control signals are respectively input into the transmitters/receivers 13a to 13d of the rotator-specific communication devices 7a to 7d, converted back into the control signals, and input into the power devices 18a to 18d via the drive circuits.

Here, the signal strength S of the signals input into the transmitters/receivers 7a to 7d is detected at the received signal strength indicators 14a to 14d. The detected signal strength information is converted into high frequency signals and transmitted, as sensing signals together with each piece of information indicating the operating states and the like of the power devices 18a to 18d, from the transmitters/receivers 13a to 13d to the rotator-specific antennas 5a to 5d.

The high frequency sensing signals emitted from the rotating rotator-specific antennas 5a to 5d are received by the stator-specific antennas 4a to 4d.

These high frequency sensing signals are adjusted in amplitude by the same amounts as those described above by the amplifiers 67a to 67d, combined by the power combiner/splitter 9, and input into the transmitter/receiver 8.

The input high frequency sensing signal is converted back into the sensing signal. The pieces of information indicating the operating states and the like of the power devices 18a to 18d are transmitted to the controller 16 to use for control signal generation. The signal strength information is transmitted to the amplifier controller 66 and the memory 68, and the table is updated if necessary.

The example was described here in which four stator-specific antennas and four rotator-specific antennas are used. However, the effect can be produced with two or more stator-specific antennas and one or more rotator-specific antennas.

The process of amplitude control between the stator-specific communication device and the rotator-specific communication device in the embodiment is described with reference to FIGS. 15 and 16.

Figure 15:
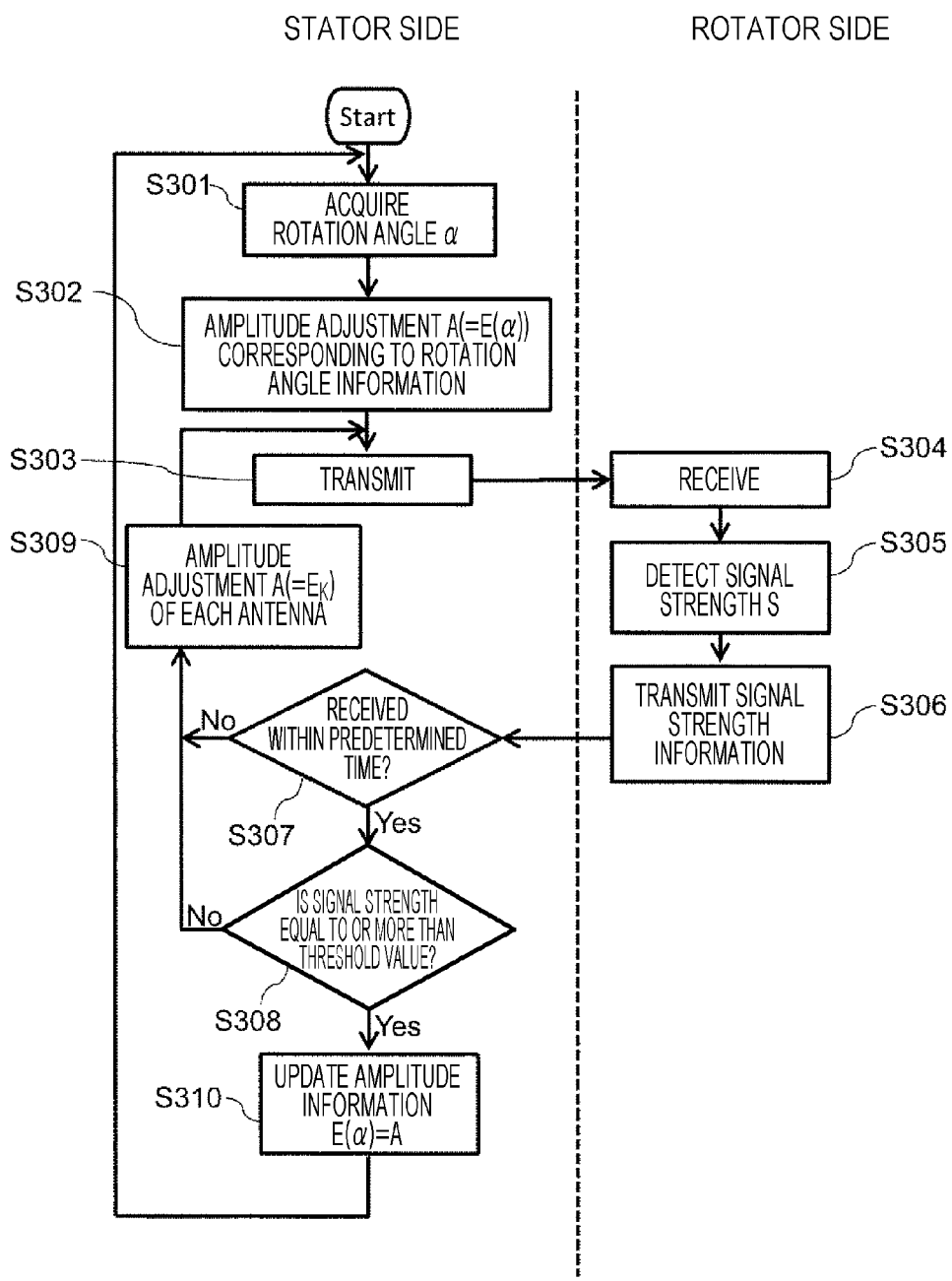
FIG. 15 is a flowchart explaining the process of controlling the phase angles of signals exchanged between a stator-specific communication device and the rotator-specific communication device, according to the fourth embodiment.

FIG. 15 is a flowchart explaining the process of amplitude control between the stator-specific communication device and the rotator-specific communication device.

FIG. 16 is a diagram illustrating an example of combinations of amplitude adjustment amounts.

In the stator-specific communication device 69, the amplifier adjustment unit 66 acquires the rotation angle α from the rotary encoder 15 (S301). The phase shift controller 66 reads, from the memory 11, the amplitude adjustment amount E (α) corresponding to the acquired rotation angle information, and controls the phase shifters 67a to 67d to have the amplitude adjustment amount A=E(α) (S302).

In the initial state, k=1 in FIG. 16 is stored in the table of the amplitude adjustment amounts of the total angle of rotation. In other words, the amplitude is not adjusted in each amplifier.

The transmitter/receiver 8 upconverts control signals input from the controller 16, converts the control signals into high frequency control signals, and transmits the high frequency control signals via the power combiner/splitter 9 and the stator-specific antennas 4a to 4d (S303).

The transmitters/receivers 13a to 13d of the rotator-specific communication devices 7a to 7d receive the high frequency control signals from the rotator-specific antennas 5a to 5d (S304).

The received signal strength indicators 14a to 14d detect the signal strength S of the high frequency control signals (S305). The detected signal strength information is converted into high frequency signals, and input as sensing signals together with each piece of information indicating the operating states and the like of the power devices 18a to 18d from the transmitters/receivers 13a to 13d to the transmitter/receiver 8 via the rotator-specific antennas 5a to 5d, the stator-specific antennas 4a to 4d, and the power combiner/splitter 9.

At this point in time, if the signal strength S is smaller than the minimum sensitivities of the transmitters/receivers 13a to 13d and 8, and the signals are not received within an expected time (S307), or if the signal strength S is equal to or less than a threshold value (S308), the amplifier controller 66 changes the amplitude adjustment amount A of the amplifiers 67a to 67d (S309), and transmits high frequency control signals again (S303).

At this point in time, the amplitude adjustment amount A is selected from k=2 to 15 of FIG. 16 in such a manner as that each amount of change in amplitude amount is a minimum.

The amplitude adjustment amount A may be selected in ascending order from k=2, or may be selected randomly.

If the transmitter/receiver 8 receives a signal equal to or more than the threshold value within the predetermined time, the amplitude adjustment amount A used at that time is updated as the phase adjustment amount table E (α) in the memory 11 (S310). The processing returns to the flow of the acquisition of the rotation angle (S301).

As described above, a series of flows is complete when the prescribed predetermined time period, number of rotations, number of times end, or when a higher level system issues a command.

Moreover, if the rotational speed cannot be ignored with respect to the communication speed, means for measuring a delay amount until a signal from a communication device on the stationary side is detected by a signal strength indicator on the rotation side is provided to obtain further stability of signal strength. Specifically, it is effective to calculate a rotation angle at the time of the detection of signal strength from the delay amount, rotation angle, and rotational speed, and adjust the amplitude of the signal based on the rotation angle or record the rotation angle in the memory.

Moreover, the combinations of the amplitude adjustment amounts of FIG. 16 are an example. The possibility of being capable of increasing the signal strength is increased when combinations of amplitude adjustment amounts in smaller steps in a wider range are used. Conversely, if the number of combinations of amplitude adjustment amounts is small, the required time for the series of flows can be reduced. In this manner, a selection can be made in accordance with system requirements such as the real time property and the communication quality.

As described above, the rotator communication apparatus 500 according to the fourth embodiment is used in wireless communication between the rotator and the stator, and can perform stable, continuous communication also during rotation even under a complicated multipath environment due to multiple reflections in the conductive housing. Therefore, one-to-N communication and two-way communication can be achieved.

Moreover, according to the fourth embodiment, the rotator communication apparatus 500 can have the amplifier configured of a high frequency switch and accordingly can be fabricated with a simple and inexpensive configuration.

Fifth Embodiment

Hereinafter, a rotator communication apparatus according to a fifth embodiment of the present invention is described with reference to FIGS. 17 and 22.

Figure 17:
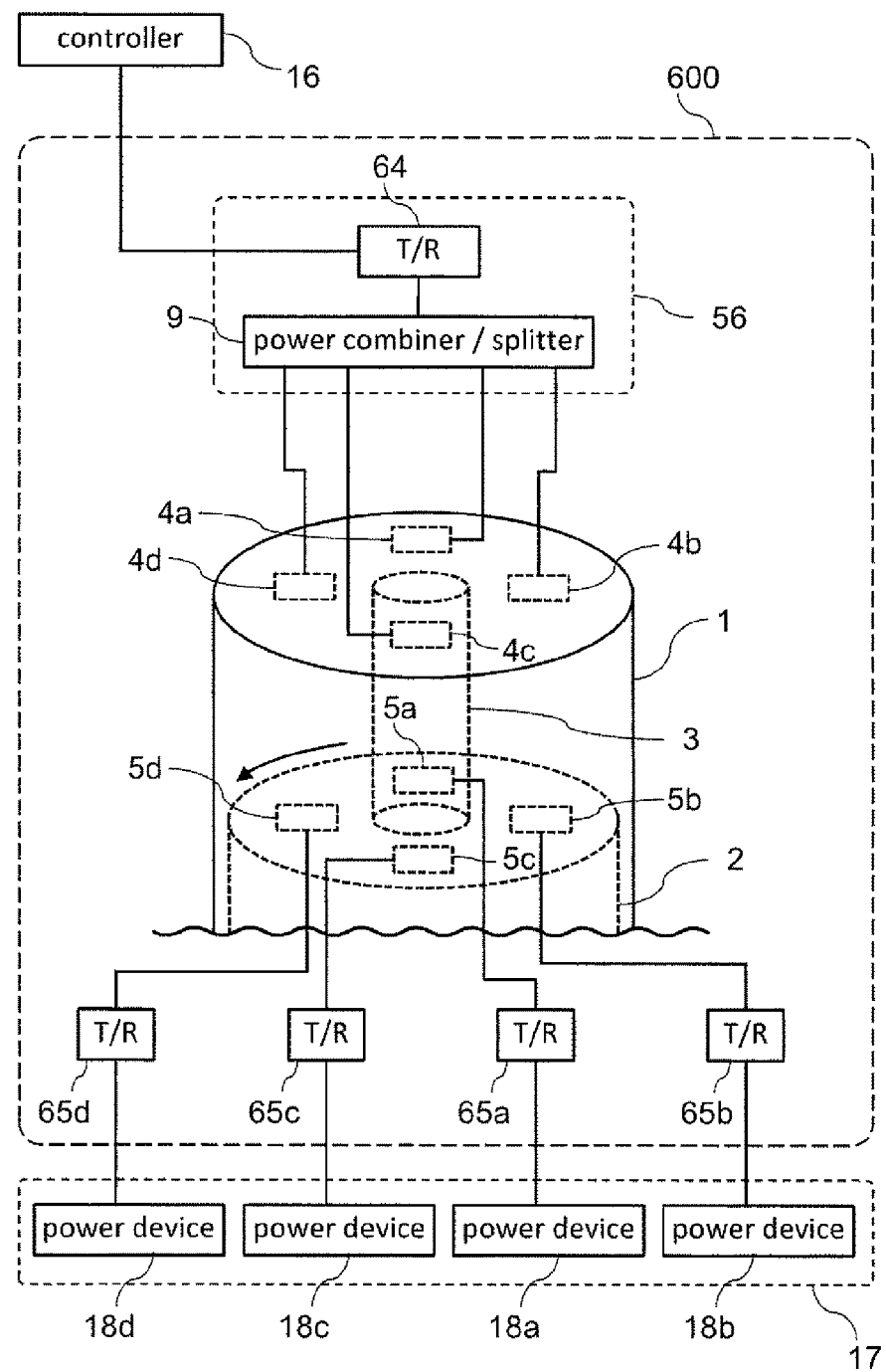
FIG. 17 is a block diagram illustrating the configuration of a rotator communication apparatus 600 according to a fifth embodiment.

FIG. 17 is a block diagram illustrating the configuration of a rotator communication apparatus 600.

A portion where antennas are mounted is illustrated by a perspective view to facilitate the understanding of the arrangement of the antennas. The rotator communication apparatus 600 is configured of the stator-specific communication device 56 and the stator-specific antennas 4a to 4d, which are attached to the stator 1, and rotator-specific communication devices 65a to 65d and the rotator-specific antennas 5a to 5d, which are attached to the rotator 2.

The stator-specific communication device 6 includes the transmitter/receiver 64 and the power combiner/splitter 9. The transmitter/receiver 64 of the stator-specific communication device 6 upconverts a control signal input from the controller 16 to convert into a high frequency control signal.

The plurality of converted high frequency control signals is split by the power combiner/splitter 9 and input into the stator-specific antennas 4a to 4d. The high frequency control signals emitted from the stator-specific antennas 4a to 4d are received by the rotating rotator-specific antennas 5a to 5d.

The received high frequency control signals are respectively input into the rotator-specific communication devices 65a to 65d, converted back into the control signals, and input into the power devices 18a to 18d via the drive circuits.

The sensing signals of the power devices 18a to 18d are respectively converted into high frequency signals by the rotator-specific communication devices 65a to 65d, and transmitted to the rotator-specific antennas 5a to 5d.

The high frequency sensing signals emitted from the rotating rotator-specific antennas 5a to 5d are received by the stator-specific antennas 4a to 4d.

These high frequency sensing signals are combined by the power combiner/splitter 9 and input into the transmitter/receiver 64. The input high frequency sensing signal is converted back into the sensing signal, and each piece of information indicating the operating states and the like of the power devices 18a to 18d is transmitted to the controller 16 to use for control signal generation.

Figure 18:
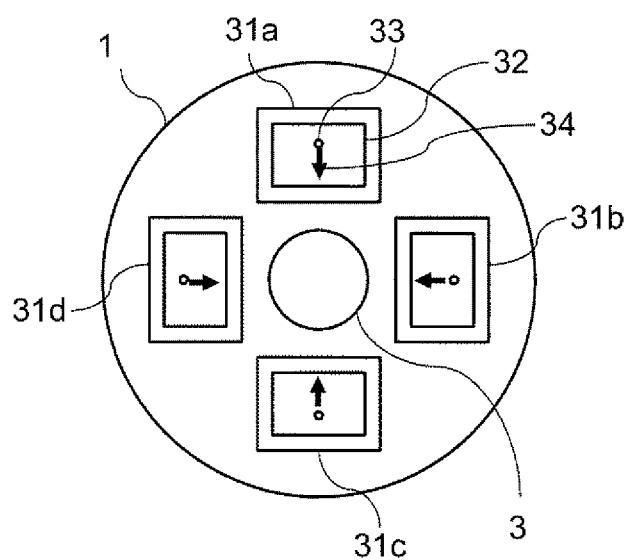
FIG. 18 is a perspective view of the stator 1 according to the fifth embodiment, as viewed from the length direction of the rotation shaft 3.

FIG. 18 is a perspective view of the stator 1 as viewed from the length direction of the rotation shaft 3.

Only stator-specific antennas 31a to 31d are illustrated, and rotator-specific antennas arranged symmetrically with the same configuration are omitted.

Moreover, the stator-specific antennas 31a to 31d are arranged concentrically with the rotation shaft 3 as the center. A patch antenna configured of a printed board is used for the antenna to reduce the centrifugal load.

In other words, the antenna is configured by superposing a placed conductor and a dielectric, which are of the same size as the stator-specific antenna 31a, and a stator-specific antenna radiating element 32. A polarization direction 34 is determined depending on the position of a feed point 33 with respect to the stator-specific antenna radiating element 32. When the feed point 33 is placed on a line linking centers of two long sides of the stator-specific antenna radiating element 32, the polarization direction 34 is a direction in which the short sides extend. In other words, the polarization direction 34 agrees with the radiation direction with the rotation shaft as the center. The same shall apply to the stator-specific antennas 31b to 31d.

The stator 1 and the rotation shaft 3 are made of conductors so that a tubular waveguide is simulatively formed in the stator. The electric field direction is the same as the polarization direction 34 in the propagation mode of the waveguide. Therefore, the radiation from the stator antenna radiating element 32 is converted to the tubular waveguide with low loss. The passband loss from the stator antenna to the rotator antenna can be kept low.

Figure 19:
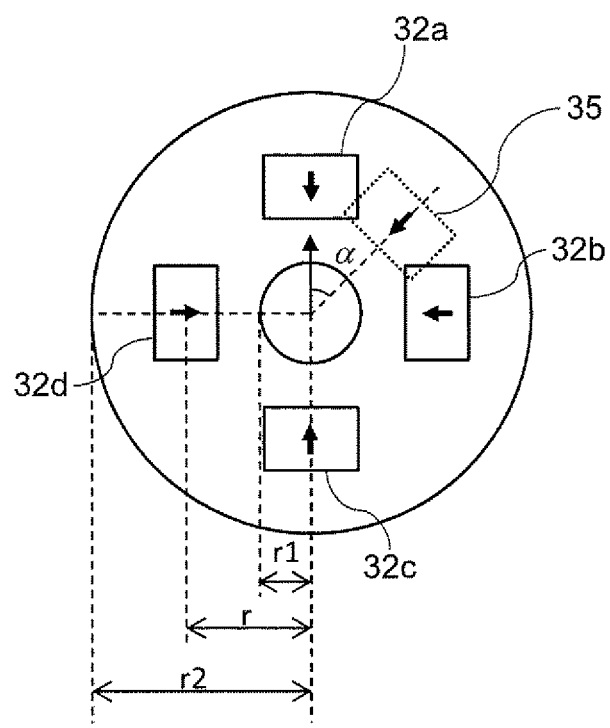
FIG. 19 is a simplified diagram including only the antenna radiating portions of FIG. 18, according to the fifth embodiment.

FIG. 19 is a simplified diagram including only the antenna radiating elements of FIG. 18. For simplification of description, only one rotator-specific antenna radiating element 35 is illustrated on the rotator side.

Moreover, stator-specific antenna radiating elements 32a to 32d and the rotator-specific antenna radiating element 35 are arranged concentrically with the distance r from the center of the rotation shaft as the radius. The rotator-specific antenna radiating element 35 rotates around the rotation shaft by the rotation angle α.

Moreover, the rotation angle α indicates the angular difference between the polarization directions of the stator-specific antenna radiating element 32a and the rotator-specific antenna radiating element 35. When the angular difference is 45 degrees, the signal strength generally becomes ½ compared to 0 degrees and, when the angular difference is 90, becomes approximately zero. Let the radius of the rotation shaft be r1 and let the radius of the stator be r2.

Figure 20:
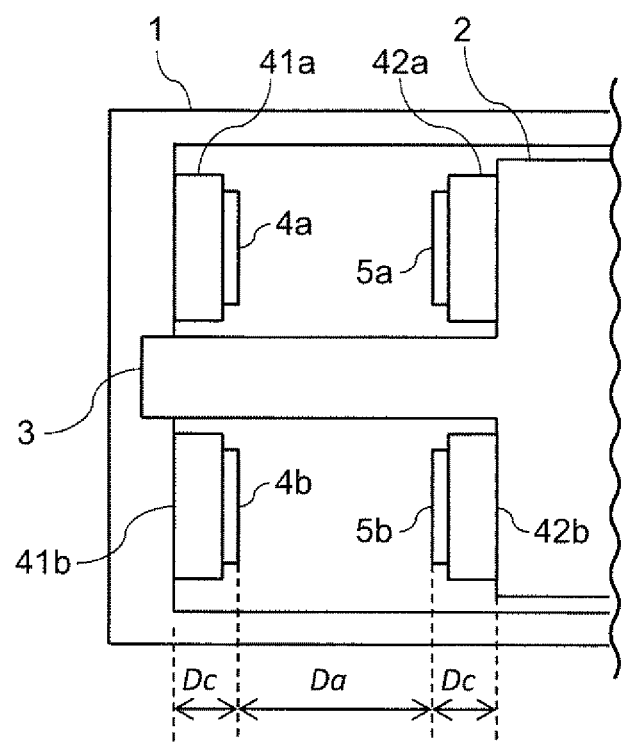
FIG. 20 is a cross-sectional view of a plane including a rotation shaft center line of the rotator communication apparatus 600 according to the fifth embodiment.

FIG. 20 is a cross-sectional view of a plane including a rotation shaft center line of the rotator communication apparatus 600. The stator-specific antennas 4a and 4b are arranged on stator-specific spaces 41a and 41b placed on the stator. The rotator-specific antennas 5a and 5b are similarly arranged on rotator-specific spaces 42a and 42b placed on the rotator.

The stator-specific spacers 41a and 41b and the rotator-specific spacers 42a and 42b are all configured of dielectrics with a thickness Dc.

Moreover, the stator-specific antennas 4a and 4b are the distance Da away from the rotator-specific antennas 5a and 5b.

The stator 1 is made of a conductor. Therefore, a standing wave is expected to be excited by a multipath. Therefore, Da is set in such a manner as to approach an integer multiple of a one-half effective wavelength, and Dc an odd multiple of a one-quarter effective wavelength. Accordingly, the standing wave has a peak at the positions of the stator-specific antenna and the rotator-specific antenna so that the signal strength can be increased.

Moreover, it is also effective to select a frequency of a radio wave to be used to prevent the standing wave from occurring in the stator 1, or from becoming complicated. In other words, the frequency to be used is set to be substantially the same as or smaller than the cutoff frequency of the propagation mode of a closed space in the stator 1.

Specifically, the frequency to be used is required to be selected in such a manner as that (In FIG. 19, r2−r1) is one-half effective wavelength or shorter. A space where the radio wave is used is in a substantially enclosed state by the stator 1. Accordingly, the level of the leakage of the radio wave to the outside and the level of interference from the outside are sufficiently low. Moreover, mesh-like holes sufficiently smaller than the wavelength of the radio wave to be used for the stator 1 are provided to use for cooling of a generator and the like.

Figure 21:
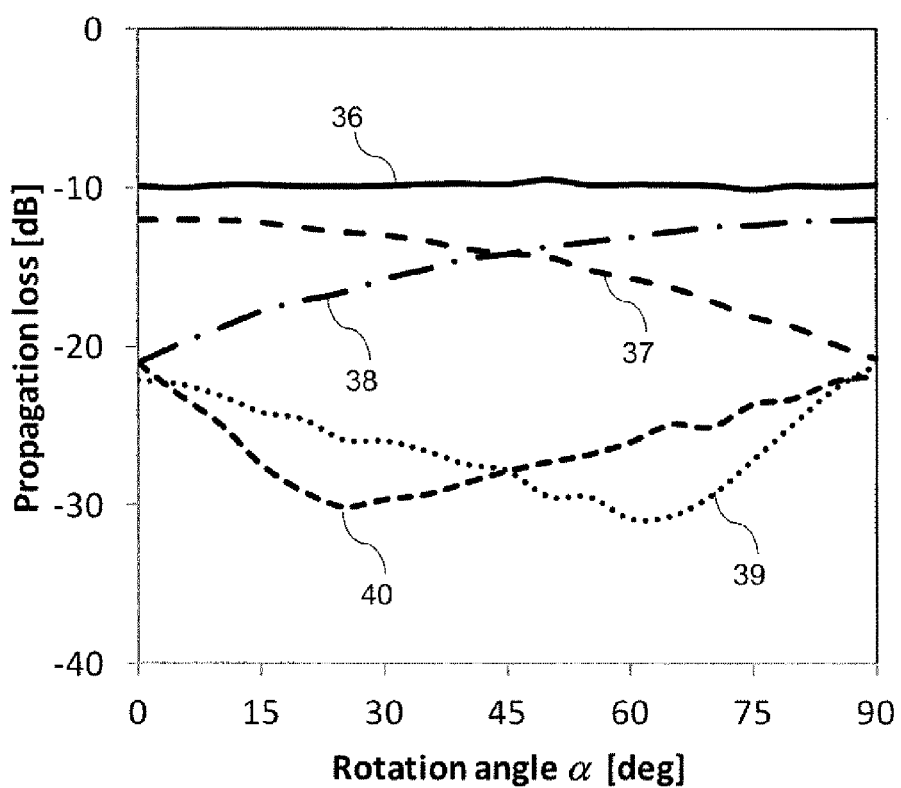
FIG. 21 is measurement results of the rotator communication apparatus 600 according to the fifth embodiment.

FIG. 21 illustrates the calculation results of the rotation angle characteristics of the throughput of the above-mentioned rotator communication apparatus, as an example of design. The rotation angle α is defined in FIG. 19. All the throughputs include a throughput of −8 dB of a four-way split circuit. A throughput 37 is a throughput from the stator-specific antenna radiating element 32a to the rotator-specific antenna radiating element 35, and reduces by −3 dB (approximately 50%) when α=45 deg compared to when α=0 deg where the polarization directions agree, and the throughput 37 reduces as a approaches 90 deg.

Even if the rotation angle is changed, it is within the antenna radiation area, and a change in the distance is also small. Therefore, there is substantially the above-mentioned tendency.

A throughput 38 is a throughput from the stator-specific antenna radiating element 32b to the rotator-specific antenna radiating element 35, and exhibits the totally opposite tendency. A throughput 39 is a throughput from the stator-specific antenna radiating element 32c to the rotator-specific antenna radiating element 35. A throughput 40 is a throughput from the stator-specific antenna radiating element 32d to the rotator-specific antenna radiating element 35. The throughputs 39 and 40 are generally small due to shielding by the rotation shaft.

The total value of the throughputs is a combined throughput 36, which hardly changes even if the rotation angle α changes from 0 to 90 deg. This indicates that stable communication is possible.

The calculation frequency was set to 2.4 GHz. The other calculation parameters are as follows: In FIG. 19 the rotation shaft radius r1=30 mm, the antenna arrangement radius r=49 mm, the stator radius r2=67.5 mm, and In FIG. 20 the distance Da between antennas=50 mm, and a distance Dt between the antenna and the conductor=20 mm.

Moreover, an antenna with a size of 30 mm×30 mm was used for calculation. The example was described here in which four stator-specific antennas and four rotator-specific antennas are used. However, the effect can be produced with three or more stator-specific antennas and one or more rotator-specific antennas.

Figure 22:
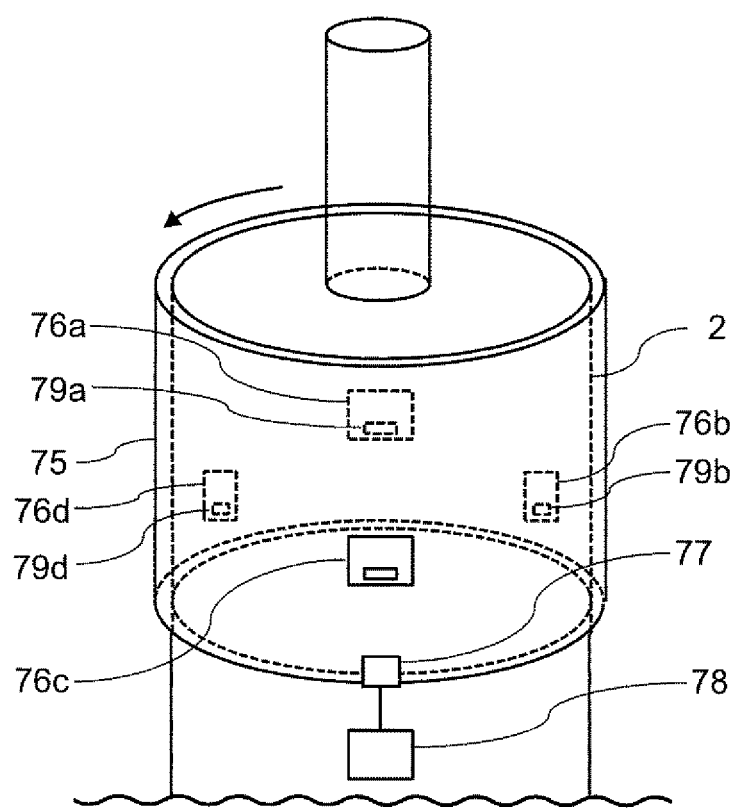
FIG. 22 is an example of means for supplying electric power to a rotator-specific communication device according to the fifth embodiment.

FIG. 22 is an example of means for supplying electric power to a rotator-specific communication device according to the embodiment. A planar propagation medium 75 has the same configuration as the one described in FIG. 8, and is placed in such a manner as to be wound around the curved surface of the rotator 2.

Rotator-specific communication devices 76a to 76d are placed on a planar mesh conductor of the planar propagation medium 75 with an insulating film (not illustrated) interposed therebetween. The rotator-specific communication devices 76a to 76d include power receiving interfaces 79a to 79d that receive evanescent waves, and can exchange electric power with the planar propagation medium 75. A power transmission interface 77 that transmits evanescent waves is placed on the planar mesh conductor of the planar propagation medium 75. A power transmission apparatus 78 is connected to the power transmission interface 77.

Electric power in the microwave band is transmitted from the power transmission apparatus 78. The power receiving interface 79a to 79d are supplied with electric power as long as they are on the planar propagation medium 7 and accordingly have a high degree of flexibility in layout.

Moreover, even if the number of power receiving interfaces is increased, electric power is supplied.

The insulating film plays a role in matching the impedance of the power receiving interfaces 79a to 79d to that of the planar propagation medium 75 and insulation between the rotator-specific communication devices 76a to 76d. When a patch antenna, dipole antenna, loop antenna or the like that can be configured on a multilayer printed board is used to allow the rotator-specific communication device 76a to be provided on the same board as the power receiving interface 79a. The same shall apply to the power receiving interfaces 79b to 79d.

When an antenna that can be configured on a multilayer printed board is similarly used to allow the integration of the power transmission interface 77 with the power transmission apparatus 78.

From the above configuration, the power transmission apparatus 78 transmits electric power to the planar propagation medium 75 via the power transmission interface 77. The power receiving interfaces 79a to 79d receive the electric power. Rectifier circuits built in the rotator-specific communication devices 76a to 76d rectify the electric power from the microwave to direct current. The direct current is used for a power supply of the rotator-specific communication devices 76a to 76d.

In the example, the evanescent wave is used. Therefore, unnecessary radiation to the outside can be extremely reduced.

As described above, the rotator communication apparatus 600 according to the fifth embodiment is used in wireless communication between the rotator and the stator, and can perform stable, continuous communication with a small number of components also during rotation even under a complicated multipath environment due to multiple reflections in the conductive housing. Therefore, one-to-N communication and two-way communication can be achieved.

Moreover, according to the fifth embodiment, the radiation from the antenna is converted with low loss into the propagation mode of a pseudo tubular waveguide formed in the stator. Accordingly, the rotator communication apparatus 600 can keep the passband loss from the stator antenna to the rotator antenna low.

Moreover, according to the fifth embodiment, the rotator communication apparatus 600 can optimize the arrangement of the antennas and increase the signal strength also under a standing wave environment inside the stator.

The present invention is not limited to the embodiments, and includes various modifications. For example, the embodiments are for describing the present invention in detail to describe the present invention in an easy-to-understand manner. The present invention is not necessarily limited to those including all the described configurations.

Moreover, part of a configuration example of a certain embodiment can be replaced with another configuration example of the same embodiment or a configuration example of another embodiment. Moreover, the configuration of a configuration example of a certain embodiment can also be added to another configuration example of the same embodiment or a configuration example of another embodiment. Moreover, the addition/deletion/replacement of another configuration can be performed on part of configurations of each embodiment.

REFERENCE SIGNS LIST 1 stator
2 rotator
3 rotation shaft
4a to 4d stator-specific antenna
5a to 5d rotator-specific antenna
6 stator-specific communication device
7, 7a to 7d rotator-specific communication device
8 transmitter/receiver
9 power combiner/splitter
10 phase shift controller
11 memory
12a to 12d phase shifter
13a to 13d transmitter/receiver
14a to 14d received signal strength indicator
15 rotary encoder
16 controller
17 electric power converter
18a to 18d power device
19 high frequency control signal
20 high frequency sensor signal
21 main generator
22, 25 rotor
23, 26 stator
27 blade
29 electric power system
30 stator
31a to 31d stator-specific antenna
32 stator-specific antenna radiating element
32a to 32d stator-specific antenna radiating element
33 feed point
34 polarization direction
35 rotator-specific antenna radiating element
36 combined throughput
37 throughput
38 throughput
39 throughput
40 throughput
41a, 41b stator-specific spacer
42a, 42b rotator-specific spacer
44a to 44d radiation region of the stator-specific antenna
45 stator-specific transmitter/receiver
46a to 46d transmitter/receiver
47 power combiner/splitter
48a to 48d stator-specific antenna
49a to 49d rotator-specific antenna
50 power combiner/splitter
51 rotator-specific communication device
52 transmitter/receiver
53 received signal strength indicator
54a to 54d insulated IC
55 monitor
56 stator-specific communication device
57 rotator-specific communication device
58 phase shift controller
59 memory
60a to 60d phase shifter
61 power combiner/splitter
62 transmitter/receiver
63 received signal strength indicator
64 transmitter/receiver
65a to 65d rotator-specific communication device
66 amplifier controller
67a to 67d amplifier
68 memory
69 stator-specific communication device
70 planar conductor
71 planar dielectric
72 planar mesh conductor
73 stator-specific planar propagation medium
74a to 74d rotator-specific planar propagation medium
75 planar propagation medium
76a to 76d rotator-specific communication device
77 power transmission interface
78 power transmission apparatus
76a to 76d power receiving interface
100 planar propagation medium
200 rotator communication apparatus
201 wind power generation system
300 rotator communication apparatus
400 rotator communication apparatus
500 rotator communication apparatus
600 rotator communication apparatus

The invention claimed is:

1. A communication apparatus which uses radio waves between a stator and a rotator, comprising:
   a stator;
   a substantially cylindrical rotator which rotates around a rotation shaft attached to the stator,
   the communication apparatus performing two-way communication between at least one rotator-specific communication device placed on the rotator and one stator-specific communication device placed on the stator by using radio waves to transmit a downstream signal from the stator-specific communication device to the rotator-specific communication device and transmit an upstream signal from the rotator-specific communication device to the stator-specific communication device, wherein
   the stator-specific communication device is connected to a plurality of stator-specific antennas,
   the rotator-specific communication device is connected to at least one rotator-specific antenna, the stator-specific antennas and the rotator-specific antenna are respectively placed on the stator and the rotator in such a manner as that radiation surfaces thereof face each other, the rotator-specific communication device includes a signal strength indicator which detects a signal strength of the downstream signal, and the stator-specific communication device includes
- at least one phase shifter which increases or decreases a phase angle of the downstream signal by a phase shift amount in such a manner as that the signal strength is equal to or more than a predetermined value;
- a phase shift controller which controls said phase angle for the at least one phase shifter based on a stored phase shift amount associated with a rotation angle to increase or decrease the phase angle by the stored phase shift amount; and
- a combiner/splitter which distributes the downstream signal to the phase shifter and combines the upstream signals to output to the stator-specific communication device.

2. The communication apparatus which uses radio waves between a rotator and a stator according to claim 1, wherein the stator-specific communication device increases or decreases the phase angle based on information on the rotation angle of the rotator.

3. The communication apparatus which uses radio waves between a rotator and a stator according to claim 2, wherein the stator-specific communication device performs recording in which the phase shift amount, the rotation angle, and the signal strength are associated.

4. The communication apparatus which uses radio waves between a rotator and a stator according to claim 3, wherein the recording is performed by a command from a higher level controller which controls the communication apparatus for a predetermined time period or predetermined number of times, and the phase angle is increased or decreased from then on based on the recorded information.

5. The communication apparatus which uses radio waves between a rotator and a stator according to claim 4, further comprising a transmitter/receiver configured to measure a delay amount until the downstream signal is detected by the signal strength indicator.

6. The communication apparatus which uses radio waves between a rotator and a stator according to claim 1, wherein the predetermined value is greater than the strength of noise in the communication apparatus.

7. The communication apparatus which uses radio waves between a rotator and a stator according to claim 1, wherein
- an amplitude adjustment function of increasing or decreasing the amplitudes of the downstream and upstream signals is added to the phase shifter,
- an amplitude control function of controlling the phase shifter is added to the phase controller, and
- the phase shifter increases or decreases the phase angles, amplitudes of the downstream and upstream signals in such a manner as that the signal strength is equal to or more than a predetermined value.

8. The communication apparatus which uses radio waves between a rotator and a stator according to claim 1, wherein the communication apparatus is used to control a plurality of power devices, and an insulated element is placed between the rotator-specific communication device and the power device.

9. The communication apparatus which uses radio waves between a rotator and a stator according to claim 1,
wherein said at least one phase shifter comprises a plurality of phase shifters, and
wherein said phase shift controller adjusts the phase angle of at least one but less than all of said plurality of phase shifters.

10. A communication apparatus which uses radio waves between a rotator and a stator, comprising:
a stator; and
a substantially cylindrical rotator which rotates around a rotation shaft attached to the stator,
the communication apparatus using radio waves between at least one rotator-specific communication device placed on the rotator and one stator-specific communication device placed on the stator to transmit a downstream signal from the stator-specific communication device to the rotator-specific communication device, wherein
the stator-specific communication device is connected to at least one stator-specific antenna,
the rotator-specific communication device is connected to a plurality of rotator-specific antennas,
the stator-specific antenna and the rotator-specific antennas are respectively placed on the stator and the rotator in such a manner as that radiation surfaces thereof face each other, and
the rotator-specific communication device includes
- a signal strength indicator which detects a signal strength of the downstream signal and which converts the detected signal strength information into high-frequency signals,
- a phase shifter which increases or decreases the phase angle of the downstream signal by a phase shift amount in such a manner as that the signal strength is equal to or more than a predetermined value,
- a phase shift controller which controls the phase shifter to make an increase or decrease by the phase shift amount, and
- a combiner which combines the downstream signals output from the phase shifters to output to the stator-specific communication device.

11. The communication apparatus which uses radio waves between a rotator and a stator according to claim 10, wherein
an amplitude adjustment function of increasing or decreasing the amplitude of the downstream signal is added to the phase shifter,
an amplitude control function of controlling the amplifier is added to the phase controller, and
the phase shifter increases or decreases the phase angle, amplitude of the downstream signal in such a manner as that the signal strength is equal to or more than a predetermined value.

12. The communication apparatus which uses radio waves between a rotator and a stator according to claim 10,
wherein said at least one phase shifter comprises a plurality of phase shifters, and
wherein said phase shift controller adjusts the phase angle of at least one but less than all of said plurality of phase shifters.

13. A communication apparatus which uses radio waves between a stator and a rotator, comprising:
a stator;
a substantially cylindrical rotator which rotates around a rotation shaft attached to the stator,
the communication apparatus performing two-way communication between at least one rotator-specific communication device placed on the rotator and one stator-specific communication device placed on the stator by using radio waves to transmit a downstream signal from the stator-specific communication device to the rotator-specific communication device and transmit an upstream signal from the rotator-specific communication device to the stator-specific communication device, wherein the stator-specific communication device is connected to a plurality of stator-specific antennas, the rotator-specific communication device is connected to at least one rotator-specific antenna, the stator-specific antennas and the rotator-specific antenna are respectively placed on the stator and the rotator in such a manner as that radiation surfaces thereof face each other, a combiner/splitter is included which distributes the downstream signal to the stator-specific antennas and which combines the upstream signals to output to the stator-specific communication device, and wherein one of the stator-specific communication device and the rotator-specific communication device includes at least one phase shifter which increases or decreases a phase angle of the downstream signal by a phase shift amount in such a manner as that the signal strength is equal to or more than a predetermined value; and a phase shift controller which controls said phase angle for the at least one phase shifter based on a stored phase shift amount associated with a rotation angle to increase or decrease the phase angle by the stored phase shift amount.

14. The communication apparatus which uses radio waves between a rotator and a stator according to claim 13, wherein both of the rotator-specific antenna and the stator-specific antennas are arranged in such a manner as that the polarization directions thereof substantially agree with a radiation direction with the rotation shaft as the center.

15. The communication apparatus which uses radio waves between a rotator and a stator according to claim 13, wherein both of the rotator-specific antenna and the stator-specific antennas operate on circular polarized waves.

16. The communication apparatus which uses radio waves between a rotator and a stator according to claim 13, wherein a distance between the rotator-specific antenna and the stator-specific antenna is set to be an integer multiple of an approximately one-half wavelength of an operating frequency, a distance from the rotator-specific antenna to the closest conductor is set to be an odd multiple of an approximately one-quarter wavelength of the operating frequency, and a distance from the stator-specific antenna to the closest conductor is set to be an odd multiple of an approximately one-quarter wavelength of the operating frequency.

17. The communication apparatus which uses radio waves between a rotator and a stator according to claim 13, wherein the communication apparatus is used to control a plurality of power devices, a power combiner/splitter is placed between the rotator-specific communication device and the rotator-specific communication device, and an insulated element is placed between the rotator-specific communication device and the power device.

18. The communication apparatus which uses radio waves between a rotator and a stator according to claim 13, wherein said at least one phase shifter comprises a plurality of phase shifters, and wherein said phase shift controller adjusts the phase angle of at least one but less than all of said plurality of phase shifters.

* * * * *